US010203700B2

(12) United States Patent
Haskins et al.

(10) Patent No.: US 10,203,700 B2
(45) Date of Patent: *Feb. 12, 2019

(54) EMERGENCY AUTOLAND SYSTEM

(71) Applicant: Garmin International, Inc., Olathe, KS (US)

(72) Inventors: Scott K. Haskins, Spring Hill, KS (US); Noel J. Duerksen, Spring Hill, KS (US); Benjamin N. Patel, Parkville, MO (US); Eric Tran, Olathe, KS (US); Joseph Lombardo, Olathe, KS (US); Clayton E. Barber, Independence, MO (US)

(73) Assignee: Garmin International, Inc., Olathe, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/438,170

(22) Filed: Feb. 21, 2017

(65) Prior Publication Data

US 2018/0148192 A1 May 31, 2018

Related U.S. Application Data

(60) Provisional application No. 62/301,285, filed on Feb. 29, 2016.

(51) Int. Cl.
*G05D 1/06* (2006.01)
*G08G 5/02* (2006.01)
(Continued)

(52) U.S. Cl.
CPC ........... *G05D 1/0676* (2013.01); *B64C 13/18* (2013.01); *B64D 45/04* (2013.01); *G01S 13/913* (2013.01);
(Continued)

(58) Field of Classification Search
CPC ...... G05D 1/0676; B64D 45/04; G01S 19/15; G01S 13/913; G08G 5/0021; G08G 5/025; B64C 13/18
See application file for complete search history.

(56) References Cited

U.S. PATENT DOCUMENTS 4,330,827 A * 5/1982 Kettler ................. G05D 1/0676
701/16
5,216,611 A 6/1993 McElreath .................... 701/472
(Continued)

OTHER PUBLICATIONS

Printout from https://www.flyingmag.com/we-test-vertical-power-vp-400, published prior to Feb. 21, 2017.
(Continued)

*Primary Examiner* — Dale W Hilgendorf
(74) *Attorney, Agent, or Firm* — Samuel M. Korte; Max M. Ali

(57) ABSTRACT

Autoland systems and processes for landing an aircraft without pilot intervention are described. In implementations, the autoland system includes a memory operable to store one or more modules and at least one processor coupled to the memory. The processor is operable to execute the one or more modules to identify a plurality of potential destinations for an aircraft; calculate a merit for each potential destination identified; select a destination based upon the merit; and create a route from a current position of the aircraft to an approach fix associated with the destination that accounts for the terrain characteristic(s) and/or obstacle characteristic(s). The processor can also cause the aircraft to traverse the route, determine a final approach segment associated with the route; identify terrain characteristic(s) and/or obstacle characteristic(s) associated with the final approach segment; and determine an adjusted final approach segment accounting for the terrain characteristic(s) and/or obstacle characteristic(s).

20 Claims, 24 Drawing Sheets

(51) Int. Cl.
  *G08G 5/00* (2006.01)
  *B64C 13/18* (2006.01)
  *B64D 45/04* (2006.01)
  *G01S 13/91* (2006.01)
  *G01S 19/15* (2010.01)
  *G08G 5/06* (2006.01)

(52) U.S. Cl.
  CPC ............ *G01S 19/15* (2013.01); *G08G 5/0021* (2013.01); *G08G 5/0039* (2013.01); *G08G 5/0056* (2013.01); *G08G 5/025* (2013.01); *G08G 5/0013* (2013.01); *G08G 5/0078* (2013.01); *G08G 5/0086* (2013.01); *G08G 5/0091* (2013.01); *G08G 5/06* (2013.01)

(56) References Cited

U.S. PATENT DOCUMENTS

| | | | | |
|---|---|---|---|---|
| 6,980,892 | B1* | 12/2005 | Chen et al. | G05D 1/0676 701/16 |
| 7,568,662 | B1 | 8/2009 | Conner | 244/175 |
| 8,035,547 | B1 | 10/2011 | Flanigan et al. | 342/36 |
| 8,180,503 | B2 | 5/2012 | Estabrook et al. | 701/3 |
| 8,521,343 | B2* | 8/2013 | Spinelli | G05D 1/0676 701/17 |
| 9,851,724 | B2* | 12/2017 | Bianchi et al. | G08G 5/025 |
| 2007/0050100 | A1 | 3/2007 | Gustafson et al. | 701/3 |
| 2007/0055434 | A1* | 3/2007 | Kohlmann | B64D 45/04 701/100 |
| 2012/0072058 | A1* | 3/2012 | Regmi | G08G 5/025 701/3 |
| 2012/0147030 | A1 | 6/2012 | Hankers | 345/619 |
| 2017/0197710 | A1* | 7/2017 | Ma | G05D 1/0676 |
| 2017/0249852 | A1 | 8/2017 | Haskins et al. | 701/16 |

OTHER PUBLICATIONS

Printout from https://www.aopa.org/news-and-media/all-news/2015/september/22/diamond-debuts-autoland-system published prior to Feb. 21, 2017.

Printout from https://www.aopa.org/news-and-media/all-news/2012/december/19/diamond-to-offer-auto-landing-in-2016 published prior to Feb. 21, 2017.

Printout from https://www.tttech.com/company/research-projects/austrian/esafe/ published prior to Feb. 21, 2017.

Printout from https://www.hq.nasa.gov/office/aero/docs/ar00/goal1.5-3.htm published prior to Feb. 21, 2017.

Smith, David E., An Emergency Landing Planner (ELP) for Damaged Aircraft, NASA Ames Research Center, published Feb. 16, 2011.

* cited by examiner

| Item | Status Pane Fields | Description |
|---|---|---|
| 1 | Progress Indicator | Indication of the overall progress of the automatic landing. While the route is being calculated the progress indication should be empty/zero. |
| 2 | Where Am I? | Current aircraft location in miles relative to a nearby city. For example, "50 miles southeast of Kansas City". |
| 3 | Where Am I Going? | Description of the destination city, airport, and runway in plain English. For example, "Kansas City International Airport (KMCI), Kansas City, MO, Landing on Runway 18".<br><br>Prior to route determination the system should display "Determining best airport and route for emergency automatic landing …" |
| 4 | What's My Status? | Information on the time to landing (min), distance to the runway (miles), altitude (feet) and ground speed (mph).<br><br>Prior to route determination the system should display dashes for time to landing and distance to runway. |

FIG. 7

| Item | Message | When |
|---|---|---|
| 1 | Calculating Route | While route is being calculated |
| 2 | Aircraft turning in <time> seconds | 30 second prior to a course change of > 10 deg |
| 3 | Aircraft changing altitude | 30 second prior to an altitude change of > 200 ft |
| 4 | Aircraft changing speed | 30 second prior to a speed change of > 5 knots |
| 5 | Flap deployment in <time> seconds | 30 seconds prior to flap deployment |
| 6 | Gear deployment in <time> seconds | 30 seconds prior to gear deployment |
| 7 | Landing in 60 seconds | 1 minute prior to landing |
| 8 | Exit Aircraft | Once aircraft has stopped and engines are shut down. |

FIG. 10

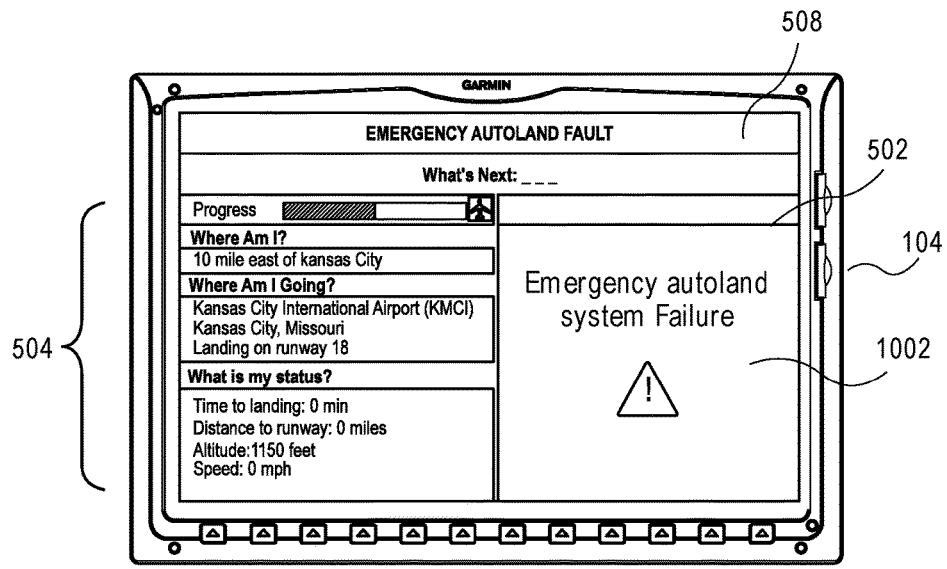

FIG. 11A

| Item | Action | Frequency | Message |
|---|---|---|---|
| 1.0 | Autoland engaged | Once on initiation | [Activation Tone], Emergency Automatic Landing Activated [Activation Tone], <Pause><br><br>The Emergency Automatic landing system has been activated. Remain Calm, No action is required. The system is locating an airport for landing. Air traffic control will be notified of the emergency situation.<br><br>You should expect to hear communication within the next minute or two. |
| 1.1 | Autoland normal disconnect | Once on disconnect | [AP disconnect tone], Emergency Autoland Disabled |
| 1.2 | Autoland abnormal disconnect | Every TBD seconds until the system is re-engaged | [AP disconnect tone], Emergency Autoland Disabled, attempting to automatically re-engage. |
| 1.3 | Destination identified and roue computed | Once when route has been identified. At least 5 seconds after the engaged message has finished. | [Chime Tone], Route identified. Landing at <airport> in <time remaining> minutes. |

FIG. 12

| Item | Action | Frequency | Message |
|---|---|---|---|
| 1.4 | Reroute | Once on initiation of re-routing due to weather | [Chime Tone], Routing around weather. Landing at <airport> in <time remaining> minutes. |
| 2.0 | Automated ATC messages | Alternate between CTAF and EMER frequency every 30 seconds | CTAF: <Airport>, <Aircraft>, <Location>, emergency autoland on <Runway><br><br>EMER: May-day, May-day, <Aircraft>, possible pilot incapacitation, <location>, emergency autoland in <time remaining> on <runway>, via <approach> |
| 3.0 | Turn (> 10 deg course change) | 30 seconds prior to event | [Chime Tone], The aircraft will be turning in 30 seconds. |
| 3.1 | Descent / Climb | 30 seconds prior to event | [Chime Tone], The aircraft will be descending to a lower altitude in 30 seconds.<br><br>[Chime Tone], The aircraft will be climbing to a higher altitude in 30 seconds. |

FIG. 12 (cont.)

| Item | Action | Frequency | Message |
|---|---|---|---|
| 3.2 | Speed change (>5 knots) | 30 seconds prior to event | [Chime Tone], The aircraft will be slowing down in 30 seconds.<br><br>[Chime Tone], The aircraft will be speeding up in 30 seconds. |
| 3.3 | Flap deployment | 30 seconds prior to event | [Chime Tone], The aircraft will be lowering the flaps in 30 seconds. |
| 3.4 | Gear deployment | 30 seconds prior to event | [Chime Tone], The aircraft will be lowering the landing gear in 30 seconds. |
| 3.5 | Landing Notification | 1 min prior to touchdown | [Chime Tone], The aircraft will be landing in 1 minute. |
| 3.6 | Landing Complete | Once shortly after touchdown (below TBD ground speed) | [Chime Tone], Remain calm and stay seated until the aircraft has reached a complete stop and the engines have shut down. Once stopped instructions will be provided on the display for exiting the aircraft. |
| 4.0 | Periodic status updates | Every 5 minutes. Stop when within 5 minutes of landing. | [Chime Tone], Emergency autoland is active. Remain Calm. No action is required. <time remaining> minutes until landing. |

FIG. 12 (cont.)

EMERGENCY AUTOLAND SYSTEM

CROSS-REFERENCE TO RELATED APPLICATIONS

The present application claims the benefit under 35 U.S.C. § 119(e) of U.S. Provisional Application Ser. No. 62/301,285, entitled EMERGENCY AUTOLAND SYSTEM, filed on Feb. 29, 2016. U.S. Provisional Application Ser. No. 62/301,285 is herein incorporated by reference in its entirety.

BACKGROUND

Integrated avionics systems replace mechanical and electro-mechanical instrument gauges and controls historically used in aircraft with one or more electronic displays for displaying primary flight information such as attitude, altitude, heading, vertical speed, and so forth, to the pilot, and/or receiving command inputs from the pilot for controlling aircraft systems. Integrated avionics systems may include one or more primary flight displays (PFD) and one or more multifunction displays (MFD). Further, integrated avionics systems may provide one or more controllers, such as one or more avionics control and display units (CDU), which may provide a user interface (e.g., a touch interface) to allow the aircraft's flight crew (e.g., a pilot and/or a co-pilot) to control the operation of the aircraft via the PFD and/or the MFD and to view navigation information related to the route the aircraft is traversing. Integrated avionics systems also allow the flight crew to control operation of the aircraft's systems manually via the PFD, the MFD, or other controls.

SUMMARY

Autoland systems and processes for landing an aircraft without pilot intervention are described. In implementations, the autoland system includes a memory operable to store one or more modules and at least one processor coupled to the memory. The processor is operable to execute the one or more modules to identify a plurality of potential destinations for an aircraft; calculate a merit for each potential destination identified; select a destination based upon the merit; and create a route from a current position of the aircraft to an approach fix associated with the destination that accounts for the terrain characteristic(s) and/or obstacle characteristic(s). The processor can also cause the aircraft to traverse the route, determine a final approach segment associated with the route; identify terrain characteristic(s) and/or obstacle characteristic(s) associated with the final approach segment; and determine an adjusted final approach segment accounting for the terrain characteristic(s) and/or obstacle characteristic(s). The processor can also cause the aircraft to land at the destination without requiring pilot intervention.

In another implementation, the autoland system includes a memory operable to store one or more modules, and at least one processor coupled to the memory and operably coupled to at least one of an engine of the aircraft, a braking system of the aircraft, or a control column of the aircraft. The processor is operable to execute the one or more modules to cause the processor to identify potential destinations for an aircraft. The processor can also calculate a merit for each destination identified; select a destination based upon the merit; receive terrain data and/or obstacle data, the including terrain characteristic(s) and/or obstacle characteristic(s); and create a route from a current position of the aircraft to an approach fix associated with the destination, the route accounting for the terrain characteristic(s) and/or obstacle characteristic(s). The processor can also cause the aircraft to traverse the route, determine a final approach segment associated with the route; identify terrain characteristic(s) and/or obstacle characteristic(s) associated with the final approach segment; and determine an adjusted final approach segment accounting for the terrain characteristic(s) and/or obstacle characteristic(s). The processor can also cause the aircraft to land at the destination without requiring pilot intervention.

In one or more implementations, a process for autolanding an aircraft includes identifying potential destinations for an aircraft. The process also includes calculating a merit for each destination identified; selecting a destination based upon the merit; receive terrain data and/or obstacle data, the including terrain characteristic(s) and/or obstacle characteristic(s); and create a route from a current position of the aircraft to an approach fix associated with the destination, the route accounting for the terrain characteristic(s) and/or obstacle characteristic(s). The processor can also cause the aircraft to traverse the route, determine a final approach segment associated with the route; identify terrain characteristic(s) and/or obstacle characteristic(s) associated with the final approach segment; and determine an adjusted final approach segment accounting for the terrain characteristic(s) and/or obstacle characteristic(s). The processor can also cause the aircraft to land at the destination without requiring pilot intervention.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items.

FIG. 7 is an example table illustrating example status information and associated descriptions for conveying at a display screen, such as the display screens illustrated in FIGS. 6A, 6B, 8, 9, and 11A, in accordance with example implementations of the present disclosure.

FIG. 10 is an example table illustrating instructional information relating to a next action to be taken during an emergency situation that can be conveyed to a passenger at a display screen, such as the display screens illustrated in FIGS. 6A, 6B, 8, 9, and 11A, in accordance with example implementations of the present disclosure.

FIGS. 11A and 11B are illustrations of a multifunction display (MFD) where various display attributes of status information conveying failure of autoland functionality in accordance with an example implementation of the present disclosure.

FIG. 12 illustrates an example table providing example status updates that can be conveyed at a display screen, such as the display screens illustrated in FIGS. 6A, 6B, 8, 9, and 11A, in accordance with example implementations of the present disclosure.

DETAILED DESCRIPTION

Overview

Figure 1A:
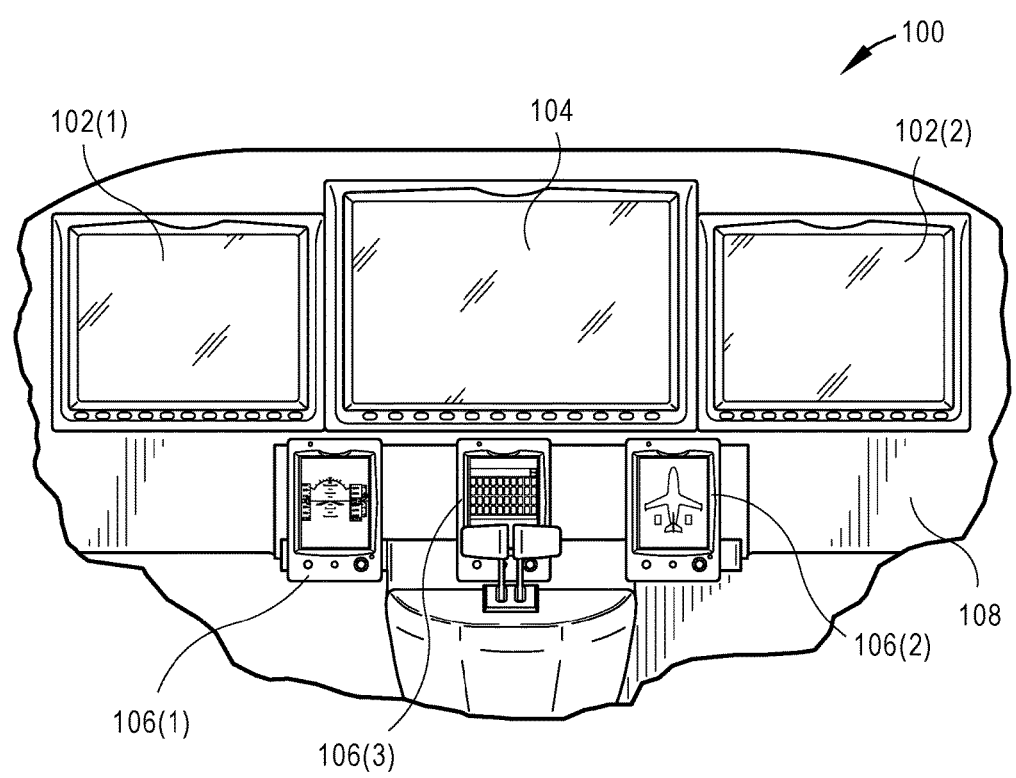
FIG. 1A is an illustration depicting a representative example instrument panel of an aircraft including an integrated avionics system configured in accordance with various implementations of the present disclosure.

Electronic devices, such as integrated avionics systems, are typically utilized by one or more members of a flight crew (e.g., the pilot and/or the co-pilot) to navigate an aircraft. Integrated avionics systems may employ primary flight display(s) (PFDs) and multifunction display(s) (MFDs) to furnish primary flight control, navigational, and other information to the flight crew of the aircraft. Additionally, the integrated avionics systems may also employ an avionics control and display unit (CDU) that is configured to provide control functionality to the PFD and/or the MFD and to convey navigation information representing an area the aircraft is traversing. While integrated avionics systems may provide the functionality flight crew and/or autopilot navigation of the aircraft, these systems lack the ability to land the aircraft without pilot and/or co-pilot intervention (e.g., in an emergency situation).

Accordingly, autoland systems and processes for landing an aircraft without pilot intervention are described. In implementations, the autoland system includes a memory operable to store one or more modules and at least one processor coupled to the memory. The processor is operable to execute the one or more modules to identify a plurality of potential destinations for an aircraft; calculate a merit for each potential destination identified; select a destination based upon the merit; and create a route from a current position of the aircraft to an approach fix associated with the destination that accounts for the terrain characteristic(s) and/or obstacle characteristic(s). The processor can also cause the aircraft to traverse the route, determine a final approach segment associated with the route; identify terrain characteristic(s) and/or obstacle characteristic(s) associated with the final approach segment; and determine an adjusted final approach segment accounting for the terrain characteristic(s) and/or obstacle characteristic(s). The processor can also cause the aircraft to land at the destination without requiring pilot intervention.

In another implementation, the autoland system includes a memory operable to store one or more modules, and at least one processor coupled to the memory and operably coupled to at least one of an engine of the aircraft, a braking system of the aircraft, or a control column of the aircraft. The processor is operable to execute the one or more modules to cause the processor to identify potential destinations for an aircraft. The processor can also calculate a merit for each destination identified, select a destination based upon the merit; receive terrain data and/or obstacle data, the including terrain characteristic(s) and/or obstacle characteristic(s); and create a route from a current position of the aircraft to an approach fix associated with the destination, the route accounting for the terrain characteristic(s) and/or obstacle characteristic(s). The processor can also cause the aircraft to traverse the route, determine a final approach segment associated with the route; identify terrain characteristic(s) and/or obstacle characteristic(s) associated with the final approach segment; and determine an adjusted final approach segment accounting for the terrain characteristic(s) and/or obstacle characteristic(s). The processor can also cause the aircraft to land at the destination without requiring pilot intervention.

In one or more implementations, a process for autolanding an aircraft includes identifying potential destinations for an aircraft. The process also includes calculating a merit for each destination identified; selecting a destination based upon the merit; receiving terrain data and/or obstacle data, the including terrain characteristic(s) and/or obstacle characteristic(s); and creating a route from a current position of the aircraft to an approach fix associated with the destination, the route accounting for the terrain characteristic(s) and/or obstacle characteristic(s). The process also includes causing the aircraft to traverse the route, determining a final approach segment associated with the route; identifying terrain characteristic(s) and/or obstacle characteristic(s) associated with the final approach segment; and determining an adjusted final approach segment accounting for the terrain characteristic(s) and/or obstacle characteristic(s). The process also includes causing the aircraft to land at the destination without requiring pilot intervention.

Example Implementations

Figure 1B:
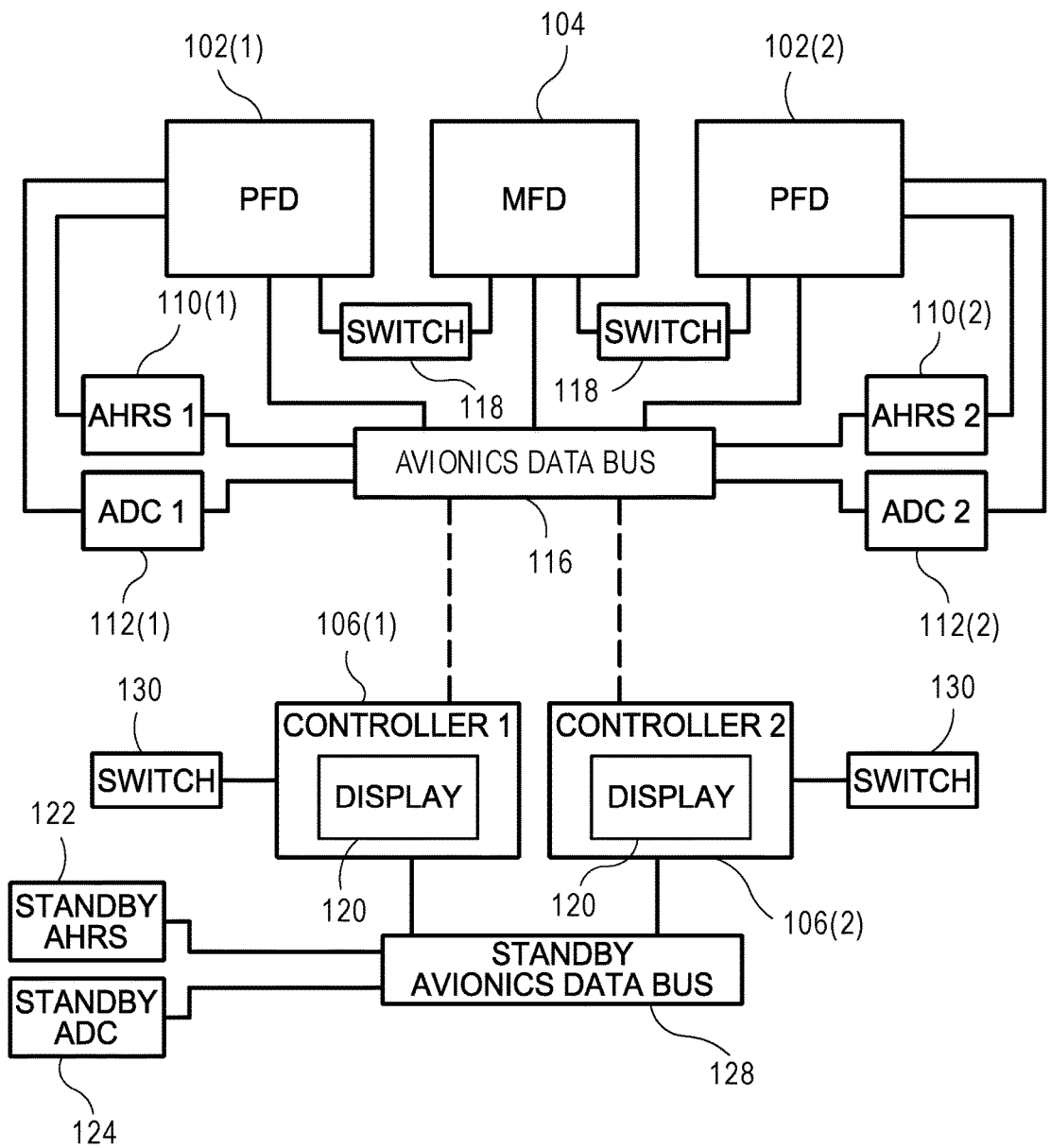
FIG. 1B is a block diagram depicting an implementation of the example integrated avionics system shown in FIG. 1A.

FIGS. 1A and 1B illustrate an example implementation of an integrated avionics system 100 within an aircraft. The integrated avionics system 100 may include one or more primary flight displays (PFDs) 102, one or more multifunction displays (MFD) 104, and one or more multi-product avionics control and display units (CDU) 106. For instance, in the implementation illustrated in FIG. 1A, the integrated avionics system 100 may be configured for use in an aircraft that is flown by two pilots (e.g., a pilot and a copilot). In this implementation, the integrated avionics system 100 may include a first PFD 102(1), a second PFD 102(2), an MFD 104, a first CDU 106(1), a second CDU 106(2), and a third CDU 106(3) that are mounted in the aircraft's instrument panel 108. As shown, the MFD 104 is mounted generally in the center of the instrument panel 108 so that it may be accessed by either pilot (e.g., by either the pilot or the copilot). The first PFD 102(1) and the first CDU 106(1) are mounted in the instrument panel 108 generally to the left of the MFD 104 for viewing and access by the pilot. Similarly, the second PFD 102(2) and the second CDU 106(2) are mounted in the instrument panel 108 generally to the right of the MFD 104 for viewing and access by the aircraft's copilot or other crew member or passenger. The third CDU 106(3) may be mounted between the first and second CDUs 106(1), 106(2). In implementations, the CDUs 106 may be positioned within the instrument panel 108 so that they may be readily viewed and/or accessed by the pilot flying the aircraft (which could be either the pilot or copilot).

The PFDs 102 may be configured to display primary flight information, such as aircraft attitude, altitude, heading, vertical speed, and so forth. In implementations, the PFDs 102 may display primary flight information via a graphical representation of basic flight instruments such as an attitude indicator, an airspeed indicator, an altimeter, a heading indicator, a course deviation indicator, and so forth. The PFDs 102 may also display other information providing situational awareness to the pilot such as terrain information, ground proximity warning information, and so forth.

As shown in FIG. 1B, primary flight information may be generated by one or more flight sensor data sources including, for example, one or more attitude, heading, angular rate, and/or acceleration information sources such as attitude and heading reference systems (AHRS) 110, one or more air data information sources such as air data computers (ADCs) 112, and/or one or more angle of attack information sources. For instance, the AHRSs 110 may be configured to provide information such as attitude, rate of turn, slip and skid, while the ADCs 112 may be configured to provide information including airspeed, altitude, vertical speed, and outside air temperature. Other configurations are possible.

Integrated avionics units (IAUs) may aggregate the primary flight information from the AHRS 110 and ADC 112 and, in one example configuration, provide the information to the PFDs 102 via an avionics data bus 116. In other examples, the various IAUs may directly communicate with either other and other system components. The IAUs may also function as a combined communications and navigation radio. For example, the IAUs may include a two-way VHF communications transceiver, a VHF navigation receiver with glide slope, a global positioning system (GPS) receiver, and so forth. As shown, each integrated avionics unit may be paired with a primary flight display, which may function as a controlling unit for the integrated avionic unit. In implementations, the avionics data bus 116 may comprise a high speed data bus (HSDB), such as data bus complying with ARINC 429 data bus standard promulgated by the Airlines Electronic Engineering Committee (AEEC), a MIL-STD-1553 compliant data bus, and so forth. A radar altimeter may be associated with one or more of the IAUs, such as via data bus 116 or a direct connection, to provide precise elevation information (e.g., height above ground) for autoland functionality. For example, in some configurations, the system 100 includes a radar altimeter to assist the autoland module 214 in various functions of the landing sequence, such as timing and maintaining the level-off and/or flare.

The MFD 104 displays information describing operation of the aircraft such as navigation routes, moving maps, engine gauges, weather radar, ground proximity warning system (GPWS) warnings, traffic collision avoidance system (TCAS) warnings, airport information, and so forth, that are received from a variety of aircraft systems via the avionics data bus 116.

In implementations, the integrated avionics system 100 employs redundant sources of primary flight information to assure the availability of the information to the pilot, and to allow for cross-checking of the sources of the information. For example, the integrated avionics system 100 illustrated in FIGS. 1A through 2 employs two PFDs 102 that receive primary flight information from redundant AHRSs 110 and ADCs 112 via redundant IAUs. The integrated avionics system 100 is configured so that the first PFD 102(1) receives a first set of primary flight information aggregated by a first IAU from a first AHRS 110(1) and ADC 112(1). Similarly, the second PFD 102(2) receives a second set of primary flight information aggregated by a second IAU from a second AHRS 110(2) and ADC 112(2). Additionally, although a single avionics data bus 116 is illustrated in FIG. 1B, it is contemplated that redundant data buses may be employed for communication between the various components of the integrated avionics system 100.

In implementations, primary flight information provided by either the first AHRS 110(1) and ADC 112(1) or the second AHRS 110(2) and ADC 112(2) may be displayed on either PFD 102(1) or 102(2), or on the MFD 104 upon determining that the primary flight information received from either AHRS 110 and ADC 112 is in error or unavailable. Reversionary switches 118 may be selected by the pilot to configure the PFDs 102 or MFD 104 to display primary flight information from either the first AHRS 110(1) and ADC 112(1) or the second AHRS 110(2) and ADC(2). One or both of the PFDs 102 may also be configured to display information shown on the MFD 104 (e.g., engine gauges and navigational information), such as in the event of a failure of the MFD 104.

The integrated avionics system 100 may employ cross-checking of the primary flight information (e.g., attitude information, altitude information, etc.) to determine if the primary flight information to be furnished to either of the PFDs 102 is incorrect. In implementations, cross-checking may be accomplished through software-based automatic continual comparison of the primary flight information provided by the AHRS 110 and ADC 112. In this manner, a "miss-compare" condition can be explicitly and proactively annunciated to warn the pilot when attitude information displayed by either PFD 102 sufficiently disagrees. The CDUs 106 may furnish a general purpose pilot interface to control the aircraft's avionics. For example, the CDUs 106 allow the pilots to control various systems of the aircraft such as the aircraft's autopilot system, flight director (FD), flight management system (FMS), electronic stability and protection (ESP) system, autothrottle, navigation systems, communication systems, engines, and so on, via the avionics data bus 116. In implementations, the CDUs 106 may also be used for control of the integrated avionics system 100 including operation of the PFD 102 and MFD 104. In implementations, one or both of the CDUs 106 may include a display 120. The display 120 of the CDU 106 may be used for the display of information suitable for use by the pilot of the aircraft to control a variety of aircraft systems. Further, as discussed in greater detail herein below, the display 120 of the CDU may be configured to display a cursor control area to facilitate manipulation of indicia displayed by a display device of the avionics system (e.g., a PFD 102 or MFD 104) via touch input to the touch screen over the displayed cursor control area.

The CDUs 106 may be operable to provide independent standby primary flight information to the pilot. The CDUs 106 may be configurable to operate in a reversionary mode to provide standby primary flight information to the pilot(s) of the aircraft. When operating in reversionary mode, the display 120 of the CDU 106 is used to display standby primary flight information. As shown in FIG. 1B, standby primary flight information, which may include information such as attitude, altitude, heading, vertical speed, and so forth, may be generated by a standby attitude and heading reference system (AHRS) 122 and a standby air data computer (ADC) 124. Data generated by AHRS 122 and ADC 124 may be provided to one or more of the CDUs 106 via a standby avionics data bus 128. In implementations, one or more mode switches 130 may be selected by the pilot to cause any number of the CDUs 106 to operate in the first mode to display standby primary flight information. While operating in the reversionary mode, the CDUs 106 may be disconnected from the avionics data bus 116 so that the CDUs 106 operate independently of and communicatively isolated from the primary components of the integrated avionics system 100 (e.g., the PFDs 102, the MFD 104, the AHRS 110, the ADCs 112, and so forth). For example, the CDUs 106 may not communicate with the avionics data bus 116 while in the first mode or may be physically disconnected from the avionics data bus 116 (e.g., via the mode switch 130, and so on).

Figure 2:
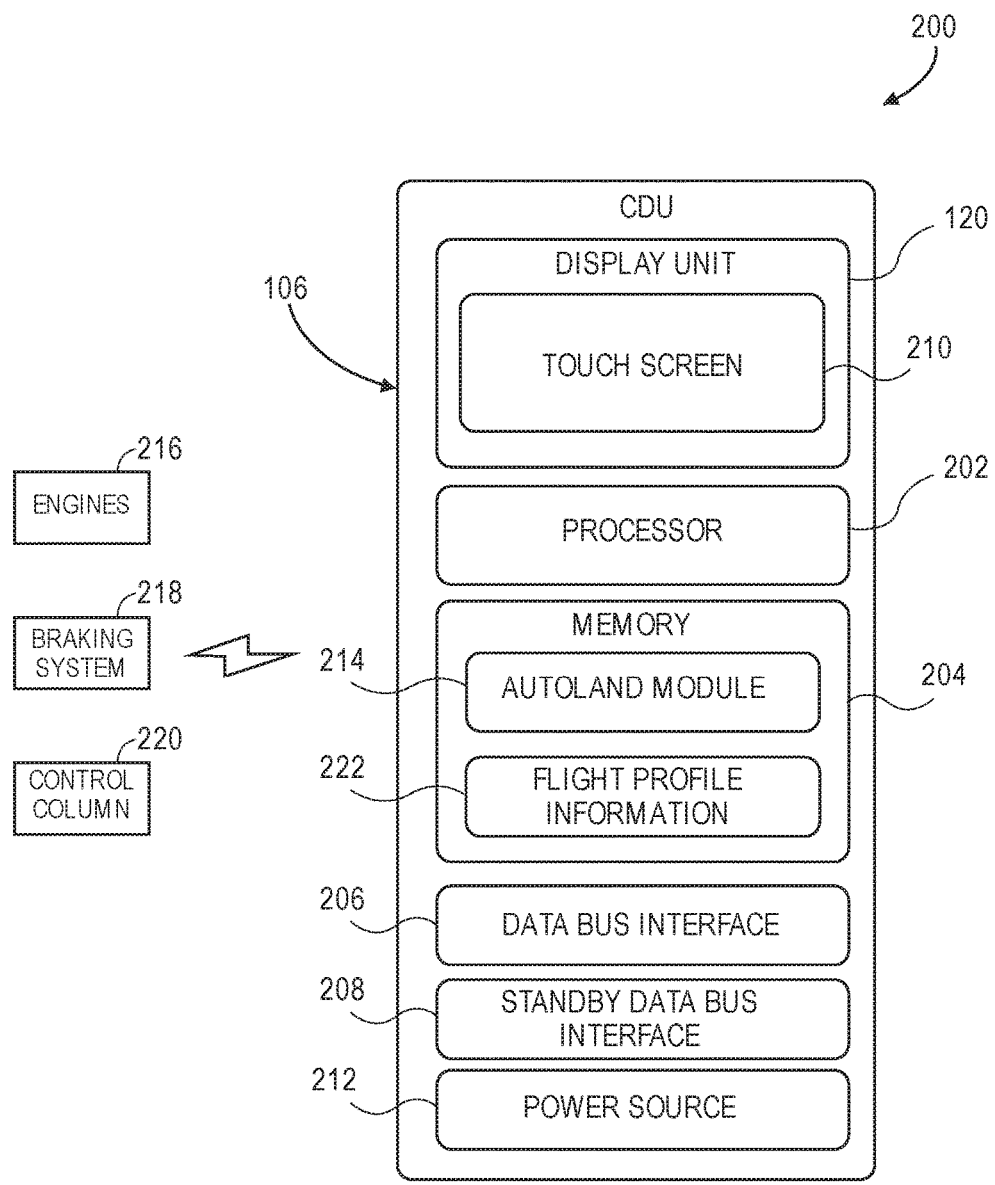
FIG. 2 is a block diagram depicting an example multi-product avionics control and display unit (CDU) suitable for use by the integrated avionics system shown in FIGS. 1A through 1B.

FIG. 2 illustrates a system 200 in an example implementation showing a representative CDU 106 of FIGS. 1A and 1B in greater detail. The CDU 106 is illustrated as including a processor 202, a memory 204, one or more avionics data bus interfaces 206, 208 and the display 120.

The processor 202 provides processing functionality for the CDU 106 and may include any number of processors, micro-controllers, or other processing systems and resident or external memory for storing data and other information accessed or generated by the CDU 106. The processor 202 may execute one or more software programs which implement techniques described herein. The processor 202 is not limited by the materials from which it is formed or the processing mechanisms employed therein, and as such, may be implemented via semiconductor(s) and/or transistors (e.g., electronic integrated circuits (ICs)), and so forth.

The memory 204 is an example of computer-readable media that provides storage functionality to store various data associated with the operation of the CDU 106, such as the software programs and code segments mentioned above, or other data to instruct the processor 202 and other elements of the CDU 106 to perform the functionality described herein. Although a single memory 204 is shown, a wide variety of types and combinations of memory may be employed. The memory 204 may be integral with the processor 202, stand-alone memory, or a combination of both. The memory 204 may include, for example, removable and non-removable memory elements such as RAM, ROM, Flash (e.g., SD Card, mini-SD card, micro-SD Card), magnetic, optical, USB memory devices, and so forth.

The avionics data bus interface 206 and the standby avionics data bus interface 208 furnish functionality to enable the CDU 106 to communicate with one or more avionics data buses such as the avionics data bus 116 and standby avionics data bus 128, respectively, illustrated in FIG. 1B. In various implementations, the avionics data bus interface 206 and standby avionics data bus interface 208 may include a variety of components, such as processors, memory, encoders, decoders, and so forth, and any associated software employed by these components (e.g., drivers, configuration software, etc.).

The display 120 displays information to the pilot of the aircraft. In implementations, the display 120 may comprise an LCD (Liquid Crystal Diode) display, a TFT (Thin Film Transistor) LCD display, an LEP (Light Emitting Polymer or PLED (Polymer Light Emitting Diode)) display, a cathode ray tube (CRT), and so forth, capable of displaying text and/or graphical information, such as a graphical user interface. The display 120 may be backlit via a backlight such that it can be viewed in the dark or other low-light environments.

The display 120 may include a touch interface, such as a touch screen 210 that can detect a touch input within a specified area of the display 120 for entry of information and commands. In implementations, the touch screen 210 may employ a variety of technologies for detecting touch inputs. For example, the touch screen 210 may employ infrared optical imaging technologies, resistive technologies, capacitive technologies, surface acoustic wave technologies, and so forth. In implementations, buttons, softkeys, keypads, knobs and so forth, may be used for entry of data and commands instead of or in addition to the touch screen 210.

As shown in FIG. 2, the system 200 (i.e., a CDU 106) includes a power source 212, such as a back-up power source, that is configured to furnish power to at least partially power the system 200 in the event the aircraft loses primary power (e.g., primary power sources are no longer furnishing power to the PFDs 102, the MFD 104, the CDUs 106, and the instrument panel 108 of the aircraft). For example, the power source 212 is configured to at least substantially power the system 200 when the aircraft is not powered by the primary power source during operation of the aircraft. In an implementation, the power source 212 comprises a battery that is configured to provide power to the CDU 106 when a loss of primary power is detected. For example, the power source 212 may be configured to furnish power to the CDU 106 automatically once the primary power ceases, or at least substantially ceases, to power the CDU 106 and/or the aircraft. In another example, the power source 212 may be configured to power the CDU 106 upon the pilot/co-pilot manually causing the power source 212 to power the CDU 106. The back-up power source is configured to furnish power to a CDU 106 for a predetermined amount of time to allow the pilot/co-pilot to utilize the CDU 106 for a limited amount of time while the primary power is not available within the aircraft.

As shown, the system 100 includes an autoland module 214, which is storable in the memory 204 and executable by the processor 202. The autoland module 214 is representative of functionality that provides automatic landing functionality for an aircraft. In one or more implementations, the autoland module 214 provides functionality that provides automatic landing functionality pertaining to airport/runway/approach selection, navigation to an approach while avoiding terrain, obstacles, and/or weather having undesirable characteristics, automatic aircraft speed control, flare processes (e.g., vertical and lateral), braking and/or ground steering, and/or engine shutdown.

In one or more implementations, the autoland module 214 provides functionality to automatically engage (e.g., activate) an emergency autoland process (see FIG. 12). For example, the autoland module 214 continuously monitors whether a pilot has engaged (e.g., interfaced, actuated, interacted, etc.) with the CDUs 106 and/or a control wheel and can automatically activate the emergency autoland process based upon one or more engagement characteristics. In an implementation, the autoland module 214 activates the autoland process once a pilot has not engaged with the CDUs 106 and/or the control wheel after a defined time period. The one or more engagement characteristics may comprise a pilot actuating one or more of the avionics equipment, continued engagement of the aircraft's autopilot system after a specified event (e.g., emergency descent, predetermined length of time, etc.), continued activation of ESP such that the autopilot system has automatically engaged, and so forth.

In one or more implementations, the autoland module 214 can automatically activate the emergency autoland process based upon the engagement characteristics and/or one or more flight characteristics (e.g., altitude of the aircraft, cabin altitude, cabin pressure, airspeed of the aircraft, flight plan, Winds and Temperature Aloft Forecast, time of night, length of flight, terrain height, a navigational input of the aircraft, etc.). For example, the autoland module 214 can detect when the cabin depressurizes below a predetermined pressure threshold and can automatically activate emergency autoland processes. In some implementations, the flight characteristics can be furnished to the system 100 by a user (e.g., pilot). The flight characteristics can also be furnished to the autoland module 214 by other components internal to the system 100 (e.g., AHRS, ADCs, IDUs, other modules, etc.). In one or more implementations, the flight characteristics are stored within flight profile information 222, which is storable in the memory 204 of the CDU 106.

In some implementations, the system 100 can issue an electronic communication notification based upon the engagement characteristics and/or the flight characteristics. For example, the autoland module 214 can cause the processor 202 to issue one or more notifications via the display 120. Notifications may be displayed in text (e.g., "Awake?"), displayed with images, haptic (e.g., vibration alerts), aural (e.g., beeps or spoken text), or communicated via another appropriate means to the user.

In some implementations, the system 100 can receive feedback from the pilot(s) in response to the electronic communication notification. For instance, the autoland module 214 can cause the processor 202 to issue an electronic communication notification that can be dismissed by the pilot. In an example implementation, the processor can issue a text notification asking if the pilot is awake. If the pilot is awake, he can dismiss the alert. The autoland module 214 can then determine whether to engage emergency autoland processes based on the feedback received. For example, if the pilot dismisses the notification, the autoland module 214 can withhold activation of emergency autoland processes. In another example, if the pilot fails to dismiss the notification within a predetermined time period (e.g., approximately 0.5 seconds to 2 minutes), the autoland module 214 can engage emergency autolanding processes as described herein. In some implementations, the system 100 can issue escalating levels of electronic communication notifications. For example, the autoland module 214 can cause the processor 202 to issue a first notification (e.g., a text notification). If the pilot fails to dismiss the notification within a predetermined time period (e.g., approximately 0.5 seconds to approximately 2 minutes), the autoland module 214 can cause the processor 202 to issue one or more additional notifications (e.g., aural, hepatic, etc.). If the pilot fails to dismiss the notification after a predetermined time period (e.g., approximately 0.5 seconds to approximately 2 minutes), the autoland module 214 can engage emergency autoland processes.

In one or more implementations, the user (e.g., pilot, crewmember) can activate the emergency autoland processes manually. For example, the pilot can manually activate the emergency autoland processes in an emergency situation (e.g., emergency descent, depressurization, pilot incapacitation, etc.). The system 100 can include a switch (e.g., guarded switch) or button configured for manually engaging the emergency autoland processes.

Upon engagement of emergency autoland processes, the module autoland 214 can cause the CDU 106 to engage one or more systems (e.g., autopilot system, flight director, autothrottle, Electronic Stability and Protection (ESP), Emergency Descent Mode (EDM), etc.) for automatically landing the aircraft. For example, the CDU 106 can cause the autopilot system to guide the aircraft to the nearest airport, the highest ranked airport based on predetermined merit weighting, and/or on a calculated route. The autoland module 214 can cause the processor 202 to execute one or more processes to determine a destination and/or a route. In some embodiments, the processor 202 can execute an endurance process to determine the aircraft's endurance based on usable fuel onboard the aircraft (endurance=current fuel/current total fuel flow). In example implementations, the aircraft has manually selected tanks for fuel usage, and the avionics does not know which tank is selected, the processor 202 may utilize the tank with the least fuel for the endurance calculation. In another implementation, if the aircraft has manually selected tanks and the avionics can identify which tank is selected, then the CDU 106 can utilize the selected tank for the endurance calculation.

The autoland module 214 can use one or more destination selection processes to identify potential destinations for the aircraft. Potential destinations can include an airport location, terrain features (e.g., fields, landing fields, other open areas), bodies of water (e.g., lakes, seaports, etc.), and so forth. In some embodiments, airports within a range of travel of the aircraft are identified based upon a determined endurance of the aircraft. For example, the module 214 can identify airports within the range of travel of the aircraft. The autoland module 214 can cause the processor 202 can identify any airports within a preselected distance from the aircraft. In some implementations, the potential airports can be those within approximately 200 to 500 miles (depending on plane type). If there are no potential destinations within the range of travel of the aircraft, the processor 202 can identify potential destinations outside of the range of travel, and the autoland module 214 may select the best available potential destination outside of the range of travel. For example, the module 214 can select the closest potential destination (e.g., the closest airport), the last loaded origin, the last loaded destination, previously available destinations, and so forth. In some implementations, the autoland module 214 can cause the processor 202 to eliminate any airports that are not appropriate candidates for landing. For example, the processor 202 can eliminate airports that have one or more configurable adverse landing characteristics. Adverse landing characteristics can include, but are not necessarily limited to: airports that do not have at least one hard surface runway, airports that are heliports only, airports that do not have at least one acceptable approach (e.g., GPS approach to a runway with vertical guidance), and so forth.

In some implementations, the system 100 can also incorporate weather data (e.g., METAR, Terminal Doppler Weather Radar (TDWR), terminal aerodrome forecast (TAF), etc.) received from each airport (or from a nearby airport should weather data not be available) in selecting potential airports. For example, the autoland module 214 can receive METAR data from one or more of the components internal to the system 100 (e.g., AHRS, ADCs, IDUs, other modules, etc.). The autoland module 214 can cause the processor 202 to eliminate airports with unfavorable weather conditions. For example, the processor 202 can treat unfavorable weather conditions as an adverse landing characteristic and eliminate those airports from the potential airports.

The autoland module 214 can then execute one or more merit processes to determine a merit for each potential destination. For example, the autoland module 214 can cause processor 202 to calculate one or more merits for each airport runway based on a variety of runway attributes. Runway attributes can include, but are not necessarily limited to: final approach coarse alignment with the runway, runway characteristics (e.g., runway length, runway width, approach vertical angle (e.g., flight path angle), gradient, etc.), weather conditions (e.g., weather rating (e.g., instrument flight rules (IFR), visual flight rules (VFR), etc.), gust, precipitation level, precipitation type, etc.), attributes specific to the airport (e.g., airport with a tower, airports that anchor class B airspace, exclusively military airports, etc.), travel time to airport (e.g., estimated time enroute (ETE)), and so forth. The autoland module 214 can cause the processor 202 can calculate a merit value for each attribute. For example, the processor 202 can assign each attribute a merit value in the range of −1.0 to 1.0, with 1.0 representing an ideal runway. Negative merit values can be considered to be out of limits. In some implementations, the processor 202 can determine a final approach course alignment runway merit for a runway corresponding to each potential destination airport. For example, the processor 202 can calculate the degrees of misalignment of the aircraft with the runway. In some implementations, the processor 202 can eliminate runways that exceed a preselected maximum misalignment threshold (e.g., 25 degrees to 35 degrees of misalignment). The processor 202 can also determine an airport attribute runway merit for each potential destination airport. For example, the processor 202 can assign a high merit value to airports with towers, as the presence of a tower can indicate that the airport has emergency facilities. The processor 202 can assign low merit values to airports that anchor class B airspace and/or exclusively military airports. The processor 202 can also determine a travel time runway merit for a runway corresponding to each potential destination airport. In example implementations, the processor 202 can calculate time to runway using groundspeed along a selected path from the wind triangle based on wind speed and/or wind direction. The processor 202 can also calculate a runway merit based on one or more runway characteristics. For example, the processor 202 can assign higher merit values corresponding to wider and/or longer runways. The processor 202 can also calculate a runway merit based on the weather conditions at each potential destination airport. For example, the processor 202 can assign low merit values to airports with low visibility, high wind speeds, and so forth.

The autoland module 214 can then determine the total merit for each airport. In implementations, the autoland module 214 can cause the processor 202 to apply a predetermined weighting factor (K) to each runway merit (M) and calculate a weighted runway merit (K*M). The sum of all weighting factors (ΣK) represents the maximum possible merit value. The sum of the weighted values (Σ(K*M)) for a runway represents the total merit for the runway. The processor 202 can also assign penalties to attributes that are out of limits (e.g., the merit is negative). For example, the processor can subtract a penalty equal to the maximum possible merit value (ΣK) from the overall merit of the runway (Σ(K*M)−ΣR). This ensures that the runway is only selected if there are no available runways where all attributes are within limits. The processor 202 can then determine which runway has the highest total merit (e.g., highest Σ(K*M)).

In some implementations, the autoland module 214 can incorporate route weather data in determining the total merit for each destination. The autoland module 214 can receive weather data (e.g., weather radar, XM, datalink weather, icing data) and/or forecast data (e.g., Winds and Temperatures Aloft Forecast data, turbulence data, windshear data, NEXRAD data, etc.) from one or more of the components internal to the system 100 (e.g., AHRS, ADCs, IDUs, other modules, etc.). Datalink weather may include satellite radio sources, FIS-B (ADS-B), Garmin Connext, and/or other datalinks. The module 214 can cause the processor 202 to analyze the weather data and/or forecast data for one or more weather intensity characteristics. Weather intensity characteristics can include, but are not necessarily limited to: precipitation level, precipitation type (e.g., rain, snow, sleet, etc.), atmospheric conditions (e.g., wind speed, wind direction, temperature, etc.), storm attributes (e.g., storm top elevation, reflectivity, vertically integrated water, probability of hail, probability of severe hail, maximum hail stone diameter size, speed and/or direction of storm movement, tornadic activity, etc.), weather conditions (e.g., weather severity, visibility, etc.), and so forth. The autoland module 214 can cause the processor 202 to compare the weather intensity characteristics to a predefined condition (e.g., a predefined severity and/or intensity threshold. For example, the autoland module 214 can cause the processor 202 to compare weather severity to predefined weather severity levels (e.g., low, medium, high, etc.), and identify weather severity areas. If the weather severity of a weather area exceeds one or more of the predefined severity levels, the autoland module 214 can cause the processor 202 to adjust the runway merit accordingly. For example, the processor 202 can create a buffer area around weather areas of predefined severity levels, and downgrade runways that require passing through those areas. The processor 202 can downgrade (e.g., assess a penalty) to runways that require a route passing through a preselected radius (e.g., approximately five miles to approximately 15 miles) of a high severity weather area (e.g., areas depicted on a NEXRAD map as red areas). The processor 202 can also eliminate (e.g., assign negative M) to runways that require a route passing through a preselected radius (e.g., approximately two miles to approximately four miles) of a high severity weather area (e.g., NEXRAD red areas). In some implementations, the processor 202 can increase the minimum distance (e.g., increase the preselected radius) from a high severity weather area (e.g., NEXRAD red areas) based on the size of the area. The processor 202 can also be configured to identify gradient changes in weather intensity characteristics. For example, the processor 202 can identify areas that change from a low severity area to a medium severity area within a specified distance (e.g., approximately one mile) and treat those areas as high severity areas. If a route cannot be determined through the weather and/or no routes can be determined due to weather (e.g., all routes contain weather that prohibits routing), the processor 202 can expand the tolerance for the predefined condition (e.g., expand the tolerance for weather severity) until a route can be determined.

In some embodiments, the autoland module 214 can select a destination based on the total merit. For example, the autoland module 214 can cause the processor 202 to select the airport with the highest runway total merit as the destination airport. The processor 202 can determine an approach fix based on the runway with the highest total merit. The approach fix can include, but is not necessarily limited to: a final approach fix (FAF), an initial approach fix from a published approach (IAF), a point on a published approach, an arbitrary fix point that the system 100 selects to enable the aircraft to land on the selected runway (e.g., a visual approach fix, etc.), and so forth. If the processor 202 is unable to identify an optimal runway (e.g., a runway with positive total merit), the processor 202 can select the runway with the highest negative merit (i.e., the least negative merit). In another implementation, the user can manually select a destination airport and/or runway from the potential airports via the touch screen 210. In some embodiments, when no destinations are within range of the aircraft (e.g., based on determined aircraft endurance), the module 214 will assign the highest merit to the potential destination with the shortest ETE, ignoring all other merits.

The autoland module 214 can create a route from the current position of the aircraft to the destination. For example, the autoland module 214 can cause the processor 202 to create a route from the current position of the aircraft to the approach fix. In some embodiments, the processor 202 can determine a lateral position for the approach fix that reflects the position of an existing published approach fix. The processor 202 can execute one or more aircraft route calculation processes to determine a route between the current aircraft position and the approach fix. In some implementations, the processor 202 can determine a direct route between the current position and the destination airport. For example, the processor 202 can create a direct route at the present altitude between the current position and the FAF. The processor 202 can then create a hold at the approach fix. For example, the processor 202 can create a standard (e.g., right turn) or non-standard (e.g., left turn) holding pattern at the FAF (e.g. based on which holding pattern is free of terrain and/or obstacle intrusion), at the FAF altitude, with minimum leg length, where the inbound course of the hold equals the outbound course from the FAF. In embodiments, the hold pattern can be based on one or more of the speed of the aircraft, the altitude of the aircraft, and/or the course of the aircraft. For example, a hold pattern can be traversed if one or more of the following conditions are met: 1) a speed of the aircraft is within a defined tolerance relative to the approach speed, 2) the course of the aircraft is within a defined tolerance relative to the FAF (e.g., within a defined tolerance of the FAF to an FAF+1), and the altitude of the aircraft is within a defined tolerance relative to the altitude of the FAF. The processor 202 can also create a waypoint associated with the runway (e.g., at the start of the runway) to allow for navigation of the runway (e.g., alignment). In one or more implementations, the aircraft route calculation process can be performed to determine and/or analyze a route in view of predefined characteristics (e.g., distance, terrain characteristics, obstacle characteristics, weather characteristics, etc.). In some embodiments, the route can be created based on the approach fix and an FAF. For example, the route can comprise a FAF-1, where the FAF-1 is a distance back from the FAF in the direction of a missed approach point (MAP) to FAF course such that the path is under the glide path.

In one or more implementations, the aircraft route calculation process can include creating the route to account for one or more terrain characteristics and/or obstacle characteristics. For example, the processor 202 can operate on the aircraft route calculation process to analyze cartographic data for terrain characteristics and/or obstacle characteristics. Terrain characteristics can include, but are not necessarily limited to elevation, altitude, horizontal dimension of the land surface, surface characteristics (e.g., bodies of water, permanent ice and/or snow, etc.), and so forth. Obstacle characteristics can include, but are not necessarily limited to buildings, power lines, other aircraft, and so forth. The autoland module 214 can cause the processor 202 to identify one or more terrain characteristics and/or obstacle characteristics, and calculate the course to avoid the terrain characteristics and/or obstacle characteristics. For example, the processor 202 can compare the terrain characteristics and/or obstacle characteristics with a predefined condition (e.g., predefined altitude or elevation threshold). The processor 202 can then create a waypoint associated with the terrain characteristic and/or obstacle characteristic. In embodiments, the processor 202 can identify the elevation and/or altitude of a land region, and create a waypoint at a preselected altitude (e.g., 1000 ft.), above the highest terrain and/or obstacle. In embodiments, the processor 202 can operate on the aircraft route calculation process to analyze cartographic data dynamically. For example, altitude constraints are always descending to the approach fix altitude by propagating the approach fix altitude back until it is less than the terrain or obstacle elevation with buffer. If it is less, then the processor 202 propagates the next elevation back until it reaches one higher, and so forth, until the approach fix is reached.

In one or more implementations, the aircraft route calculation process can include re-creating the route to account for one or more weather intensity characteristics. For example, the processor 202 can operate on the aircraft route calculation process to analyze weather data (e.g., weather radar, XM, datalink weather, icing data) and/or forecast data (e.g., Winds and Temperatures Aloft Forecast data, turbulence data, windshear data, NEXRAD data, etc.) for weather intensity characteristics. Weather intensity characteristics can include, but are not necessarily limited to: precipitation level, precipitation type (e.g., rain, snow, sleet, etc.), atmospheric conditions (e.g., wind speed, wind direction, temperature, etc.), storm attributes (e.g., storm top elevation, reflectivity, vertically integrated water, probability of hail, probability of severe hail, maximum hail stone diameter size, speed and/or direction of storm movement, tornadic activity, etc.), weather conditions (e.g., weather severity, visibility, etc.), and so forth. The autoland module 214 can cause the processor 202 to compare the weather intensity characteristics to a predefined condition (e.g., a predefined severity and/or intensity threshold) and recalculate the route to avoid weather intensity characteristics that exceed the predefined condition. For example, the processor 202 can create a waypoint associated with the weather intensity characteristics that exceed the predefined condition. In exemplary implementations, the processor 202 can identify the severity of weather areas (e.g., low, medium, high, etc.) by comparing the storm severity to predefined weather severity thresholds, as described above. In some implementations, the processor 202 can utilize forecast data (e.g., Winds and Temperatures Aloft Forecast data at a predefined altitude (e.g., 18,000 feet), NEXRAD data, etc.) to predict severity of weather areas based on one or more weather intensity characteristics (e.g., atmospheric conditions, storm attributes, etc.). The processor 202 can then create one or more waypoints to avoid the moderate and/or severe weather areas and/or predicted moderate and/or severe weather areas. As the aircraft passes a waypoint, the processor 202 can operate on the aircraft route calculation process to dynamically analyze weather data and/or forecasting data of the re-created course and create waypoints until no weather intensity characteristics exceeding the predefined condition remain on the route to the FAF. If a route cannot be determined through the weather and/or no routes can be determined due to weather (e.g., all routes contain weather that prohibits routing), the processor 202 can expand the tolerance for the predefined condition (e.g., expand the tolerance for weather severity) until the route can be re-created.

In implementations, the autoland module 214 can request and/or receive the weather data and/or forecast data from one or more of the components internal to the system 100 (e.g., AHRS, ADCs, IDUs, other modules, etc.). In some implementations, the autoland module 214 can cause the processor to compile weather data and/or forecast data received from multiple data sources into one weather tracking grid. For example, the processor 202 can overlay weather tracking grid cells with forecast data by taking the original weather tracking grid cell and copying to each cell in the direction given by the forecast data for a number of cells given by the distance each cell encompasses and the velocity of the forecast data for that area. As the system 100 dynamically monitors the weather data, the weather tracking grid is correspondingly updated.

Once a route or re-created route has been calculated, the autoland module 214 can cause the aircraft to traverse the route. For example, the autoland module 214 can cause the processor 202 to replace the flight plan's previous route with the newly calculated route to the approach fix and/or re-created route to the approach fix. The published MAP to the runway endpoint can also be loaded to the flight plan.

In embodiments, adjustments can be made to align the aircraft with the runway, provide adequate clearance for the aircraft, and/or determine if the runway is viable for routing. For example, the system 100 can determine a final approach segment for the aircraft, as shown in FIGS. 3A through 3F. The final approach segment comprises the last leg of the aircraft's approach to landing (e.g., when the aircraft is aligned with the runway for descent). The autoland module 214 can cause the processor 202 to execute one or more final approach segment determination processes to determine a final approach segment for the aircraft automatically. In implementations, the module 214 can determine the final approach segment based on runway alignment data. For example, the final approach segment can be determined based on one or more runway alignment characteristics including, but not necessarily limited to: approach fix (e.g., FAF), glide path intercept point ($GPIP_1$), glide path angle ($\theta_1$), threshold crossing height ($TCH_1$), MAP, and so forth. The placement of the MAP can be over the runway threshold, or may be artificially adjusted to the runway threshold. In one or more implementations, the module 214 can cause the processor to determine a path from the FAF to the $GPIP_1$. The runway alignment characteristics can be furnished to the autoland module 214 by other components internal to the system 100 (e.g., FMS, AHRS, ADCs, IDUs, other modules, etc.). For example, the autoland module 214 can obtain the runway alignment characteristics from the published flight plan. In other embodiments, the flight characteristics can be furnished to the system 100 by a user (e.g., pilot).

In some implementations, the final approach segment determination processes can include adjusting the final approach segment to account for one or more terrain characteristics and/or obstacle characteristics. For example, a clearance detection plane can be determined by offsetting the FAF altitude by a configurable amount (e.g., FAF clearance) and determining a second glide path angle ($\theta_2$) associated with the $GPIP_1$ (e.g., as described with reference to FIG. 3B). The module 214 can then cause the processor 202 to evaluate terrain and/or obstacle data for intrusion against the detection plane (e.g., as described with reference to FIG. 3C). For example, the autoland module 214 can cause the processor 202 to identify one or more terrain characteristics and/or obstacle characteristics with an elevation and/or altitude that exceeds that of the detection plane. If an intruding terrain characteristic and/or obstacle characteristic are detected, the processor 202 determines a GPIP lateral offset associated with the terrain characteristic and/or obstacle characteristic. For example, the processor 202 can create a path from an uppermost point of the intruding terrain/obstacle to the runway at the same angle ($\theta_2$) as the detection plane (e.g., as described with reference to FIG. 3D). The lateral offset is created by positioning the detection plane angle ($\theta_2$) on the runway back from the intrusion. If there are multiple intruding terrain and/or obstacles, the point that intrudes by the largest amount relative to the detection plane (e.g., blocks the largest portion of the detection plane) the point with the highest elevation and/or altitude) is utilized in determining the lateral offset. However, it is to be understood that other factors can be utilized to select between multiple intruding terrain and/or obstacles. For example, the point with the highest elevation and/or altitude may be utilized in determining the lateral offset.

Figure 3A:
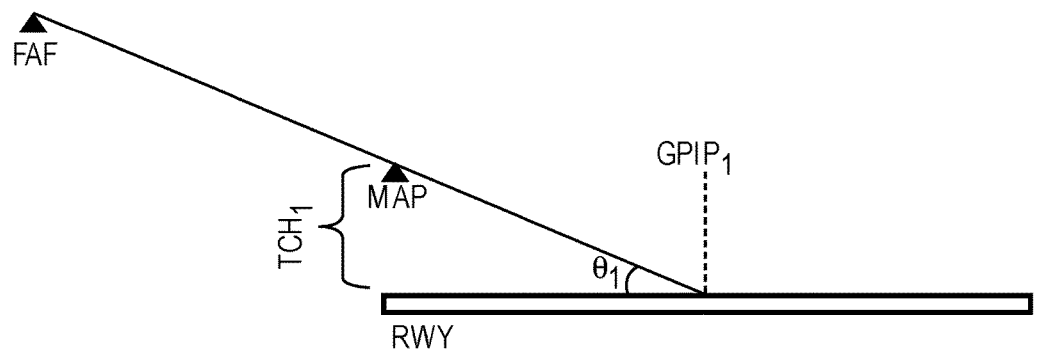
FIGS. 3A through 3F are diagrams depicting techniques for determining a final approach segment for a route of an aircraft in accordance with various example implementations of the present disclosure.
Figure 3B:
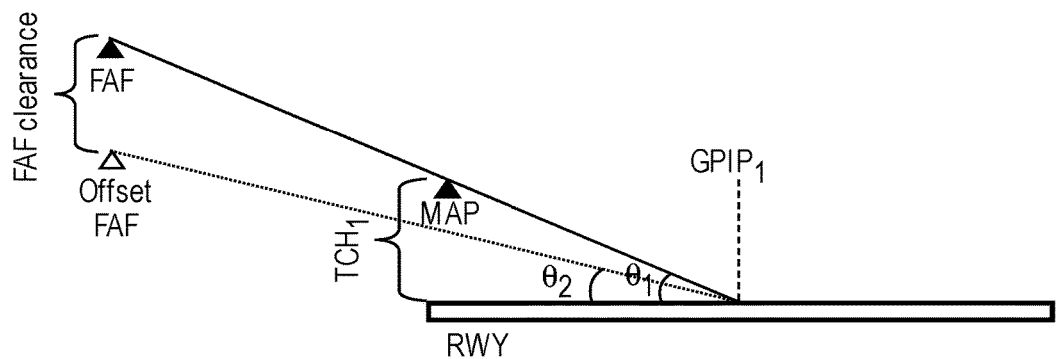
Figure 3C:
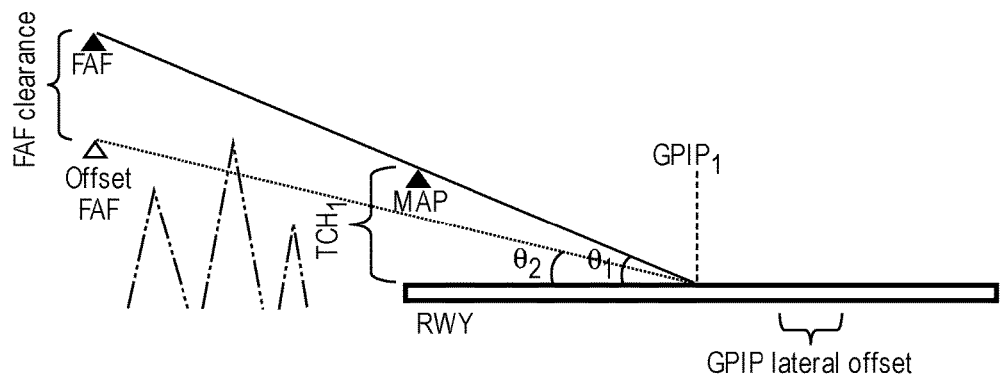
Figure 3D:
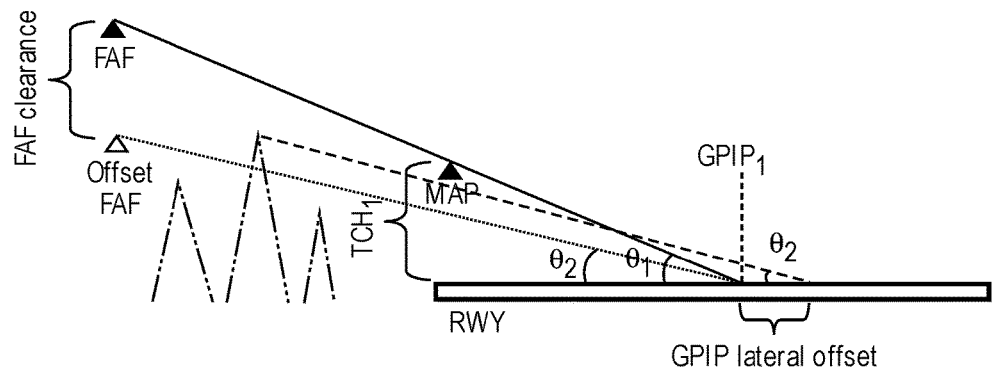
Figure 3E:
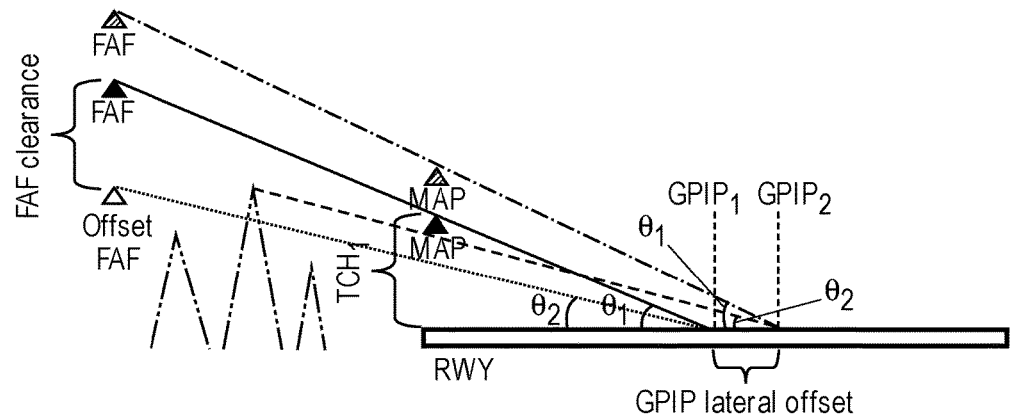
Figure 3F:
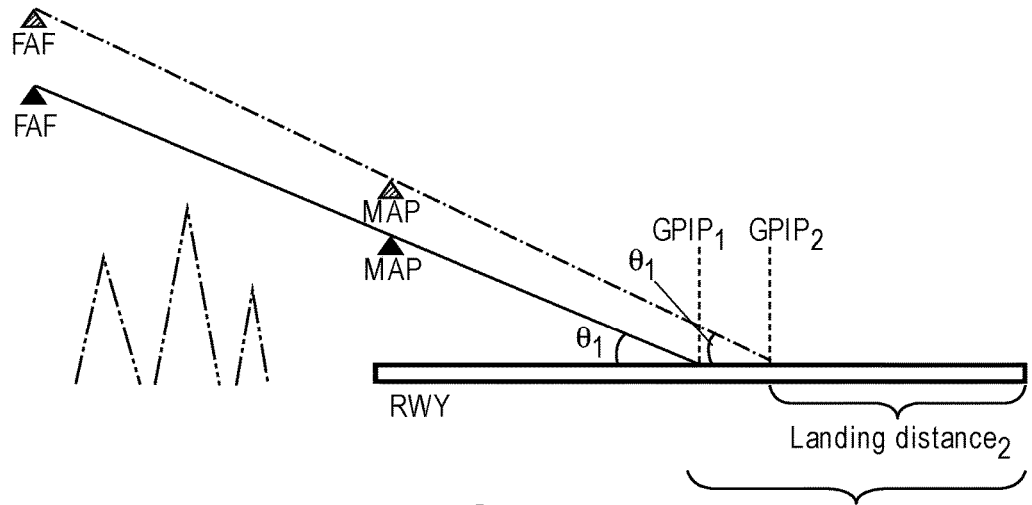

In one or more embodiments, the system 100 can determine an adjusted final approach segment that accounts for the detected terrain and/or obstacle characteristics. In some embodiments, the module 214 causes the processor 202 to determine a vertical path adjustment for the approach fix. For example, the processor 202 can determine an offset glide path intercept point ($GPIP_2$) based on the GNP lateral offset by determining the point where the path from the intrusion intersects the runway at the detection plane angle $\theta_2$ (e.g., as described with reference to FIG. 3E). The processor 202 then adjusts the final approach segment by adjusting the FAF altitude and/or the MAP altitude based on the $GPIP_2$ to create a path at the original glide path angle ($\theta_1$). As illustrated in FIG. 3F, the adjusted final approach segment will have the same approach angle ($\theta_1$) as the published approach (e.g., the adjusted final approach segment will be parallel to the original published approach segment), but will utilize a shorter landing distance (e.g., landing distance$_2$) than the landing distance for the published approach (e.g., landing distances).

In one or more embodiments, the system 100 can determine that the runway is not viable for landing based on the final approach segment and/or the adjusted final approach segment. For example, the module 214 can cause the processor 202 to determine that the runway is nonviable when the shortened landing distance (landing distance$_2$) is beneath a predetermined distance threshold. If the runway is determined to be nonviable, the runway should not be utilized for landing. In some embodiments, visual inspection of the path can be utilized to determine a final approach segment. In other embodiments, the module 214 can cause the processor 202 to select an alternative runway utilizing the techniques described herein.

In one or more implementations, the autoland module 214 can cause the flight director, autopilot system, and/or navigation system to actuate one or more modes of operation. For example, the autoland module 214 can cause the autopilot system to actuate the vertical navigation mode (VNAV) and/or the lateral navigation mode (LNAV) to traverse the route from the current position of the aircraft to the waypoint(s) and/or the approach fix. The autoland module 214 can also cause the autopilot system to actuate a flight level change (FLC) mode and/or an altitude hold mode (ALT) to achieve and/or maintain desired airspeed and/or altitude while traversing the route. For example, the autoland module 214 can cause the autopilot system to set the altitude preselector to the altitude constraints determined by the aircraft route calculation process. For example, if the altitude preselector is above the current altitude, the autopilot system can actuate FLC mode while the aircraft climbs above the FAF altitude. In another implementation, if the altitude preselector is below the current altitude, the autopilot system can actuate an ALT mode, holding the aircraft at its present altitude. The autoland module 214 can also cause the flight director and/or navigation systems to traverse the route to the FAF.

In one or more implementations, the autoland module 214 can automatically adjust the barometric pressure setting to maintain an accurate barometric pressure while the emergency autoland process is engaged. The autoland module 214 can cause the processor 202 to execute one or more barometric pressure processes to adjust the barometric pressure setting based on altitude automatically. In exemplary implementations, the processor 202 can determine the altitude of the aircraft utilizing the pressure altitude. If the altitude is above the transition altitude (e.g., 18,000 feet), the processor 202 can set the barometric correction to the standard pressure setting (e.g., 29.92 in hg). If the altitude is below the transition altitude, the processor 202 can set the barometric pressure to the navigation system altitude (e.g., GPS altitude). The processor 202 can also adjust the barometric pressure setting in preparation for approach at the approach fix, regardless of altitude. For example, the processor 202 can adjust the barometric pressure setting when the aircraft is within a predefined distance from the approach fix (e.g., 10 nautical miles) based factors such as temperature, runway elevation, GPS altitude, and so forth.

In one or more implementations, the autoland module 214 can cause the CDU 106 to actuate one or more modes of operation to maintain the flight envelope of the aircraft. For example, the autoland module 214 can cause the CDU 106 to actuate an automatic level mode. The level mode can mode can coordinate lateral (e.g., pitch), vertical (e.g., yaw), and/or thrust instructions to make an automatic climb or descent to a predefined altitude at a predefined airspeed. If the resulting power setting is too high or too low to keep the aircraft within the normal flight envelope, the CDU 106 can cause the throttle ESP to automatically adjust power as required to maintain the normal flight envelope.

Once the approach fix is reached, the autoland module 214 can execute one or more processes for landing the aircraft. For example, the autoland module 214 can cause the processor 202 to execute a suitable landing process for guiding the landing of the aircraft. The autoland module 214 can also cause the processor 202 to execute a suitable flare process to position the nose of the aircraft for touchdown. The autoland module 214 can cause the processor 202 to execute a suitable elevator process to actuate one or more flight control surfaces for landing.

If one or more of the systems (e.g., autopilot system, flight director, autothrottle, ESP, FD, EDM, etc.) become disengaged, the autoland module 214 can cause the CDU 106 to attempt to re-engage the system. For example, if the autopilot system, autothrottle, and/or flight director become disengaged via abnormal disengagement, the CDU 106 to attempt to re-engage the system(s) approximately every one (1) second while emergency autoland processes are engaged. Upon re-engagement, the autoland module 214 can re-initiate the autopilot system, autothrottle, and/or flight director to traverse to the selected approach fix.

As shown in FIG. 2, the autoland module 214 engage one or more components and/or systems of the aircraft that are internal and/or external to the system 100 for autolanding the aircraft. For example, the autoland module 214 can cause the processor 202 to actuate one or more systems and/or modes of operation of the engine 216. For example, the processor 202 can actuate the autothrottle system to control power of the engine 216. The autothrottle system can maintain predetermined speed and/or thrust during different phases of flight (e.g., cruise, descent, hold, near destination, approach, landing flare, inside the approach fix, etc.). For example, the autothrottle system can control the power of the engine 216 to maintain a predetermined minimum speed inside the approach fix. Upon landing, the processor 202 can also cause the engine 216 to transition from an operational state to a non-operational state. For example, the processor 202 can actuate one or more fuel shutoff valves, digital controls, and/or ignition switches to stop the engine 216. In some implementations, the autoland module 214 can be configured to transition the engine 216 to a non-operational state only after the aircraft has been on the ground for a predetermined period of time. For example, the autoland module 214 can actuate a plurality of switches at different points after landing. The autoland module 214 can actuate a first switch after the aircraft has been on the ground for a predetermined time interval. The module can 214 actuate a second switch when the aircraft is decelerating and/or when the wheel speed and/or airspeed is above a predefined threshold speed. The autoland module 214 can actuate a third switch when the pressure in one or more of the brake lines exceeds a predetermined pressure threshold for a predetermined period of time. The use of a plurality of switches, shutoff valves, and/or digital controls can prevent inadvertent engine shutdowns, and can ensure that fuel is removed from the engine shortly after the aircraft is on the ground. In other implementations, the autoland module 214 may shut down the engines 216 only after the aircraft has come to a stop (e.g., aircraft with braking maintained by engine-driven pump(s)).

In one or more implementations, the autoland module 214 can also cause the processor 202 to actuate the braking system 218 of the aircraft to decelerate and/or stop the aircraft. For example, the processor 202 can actuate the braking system 218 for decelerating the aircraft during landing and/or stopping the aircraft on the runway. In embodiments, the braking system can comprise a mechanical braking system and/or a non-mechanical braking system (e.g., reverse thrust, reverse prop, retracting gear, etc.).

In one or more implementations, the autoland module 214 can also cause the processor 202 to actuate one or more aerodynamic controls 220 (e.g., yokes, cyclics, side-sticks, etc.) of the aircraft. For example, the processor 202 can actuate the aerodynamic controls 220 to control directional movements of the aircraft while traversing the route and/or during landing.

Generally, any of the functions described herein can be implemented using software, firmware, hardware (e.g., fixed logic circuitry), or a combination of these implementations. The terms "module" and "functionality" as used herein generally represent software, firmware, hardware, or a combination thereof. The communication between modules in the integrated avionics system 100 of FIGS. 1A and 1B and the CDU of FIG. 2 can be wired, wireless, or some combination thereof. In the case of a software implementation, for instance, the module represents executable instructions that perform specified tasks when executed on a processor, such as the processor 202 of the CDU shown in FIG. 2. The program code can be stored in one or more device-readable storage media, an example of which is the memory 204 associated with the CDU 106 of FIG. 2.

It is contemplated that in some implementations, the autoland module 214 can provide functionality to engage processes other than an emergency autoland process. One or more of the endurance processes, the airport selection processes, the merit processes, and/or the aircraft route calculation processes can be utilized for navigating and/or landing the aircraft in a non-emergency autoland situation. In some embodiments, the system can operate on one or more of the processes to locate a suitable place to hold at the bottom of an emergency descent that is below the safe altitude for flight without oxygen and is clear of terrain. An approach to an airport can be commenced from that hold location. In some embodiments, the system can operate on one or more of the processes to select a suitable airport and/or runway, and/or develop a glide path to that airport and/or runway within gliding distance in the event of an engine failure. In some embodiments, the system can operate on one or more of the processes (e.g., the selection process) to navigate a selected location (e.g., locate fuel stops, lunch break locations, maintenance facilities, etc.) based on pilot selectable weighting parameters. Pilot selectable weighting parameters can include, but are not necessarily limited to: fuel price, on airport restaurant, availability of a crew car, etc. The route calculation processes can then be utilized to create a route to the selected location that avoids potential threats (e.g., terrain, obstacles, weather, traffic, etc.). The system 100 can also operate on one or more of the processes to create a route to a predetermined location that avoids potential threats (e.g., terrain, obstacles, weather, traffic, etc.). The route calculation processes can also be used to determine an optimized route based on predetermined factors such as time, fuel, aircraft endurance, and so forth. For example, the processor 202 can utilize weather data to generate a route with the most favorable winds or other weather conditions.

In some embodiments, the system 100 can operate on the route calculation processes to ensure clearance of the aircraft and/or create a route for the aircraft. For example, the route calculation processes can be utilized to ensure terrain clearance when instrument approaches are created. The route calculation processes can also be utilized to determine a route through mountainous terrain based on a predetermined altitude cap. In some embodiments, the route calculation processes can be utilized to create curved approaches and/or close in approaches to avoid preselected areas (e.g., noise sensitive areas, high security areas, wildlife areas, etc.). In embodiments, the system 100 can operate on the route calculation processes to re-create a route for the aircraft. For example, the processor 202 can automatically re-create a predetermined route of the aircraft (e.g., computed flight plan, track vector, etc.) to avoid potential threats (e.g., terrain, obstacles, weather, traffic, etc.). The route calculation processes can also be used to create suggested route modifications. For example, the processor 202 can suggest a recreated route to avoid potential threats (e.g., terrain, obstacles, weather, traffic, etc.). The system 100 can notify the user of the suggested re-created route, which can be accepted or dismissed by the user.

In some embodiments, the system 100 can operate on one or more of the processes to remotely activate and/or navigate an aircraft. The module 214 can be activated from a remote location (e.g., support center) for autopiloting and/or autolanding the aircraft. For example, the module 214 can be remotely activated to return unmanned aircraft to a base location. Remote activation can also be utilized to control erratic and/or unresponsive aircraft that are unable to engage the module 214 automatically.

In some embodiments, the system 100 can operate on one or more of the processes to suggest autopilot modes based on a current flight plan and/or flight characteristics (e.g., altitude of the aircraft, cabin altitude, cabin pressure, airspeed of the aircraft, flight plan, Winds and Temperature Aloft Forecast, time of night, length of flight, terrain height, a navigational input of the aircraft, etc.). The module 214 can cause the processor 202 to activate the most suitable autopilot mode based on the flight plan and/or flight characteristics. For example, the module 214 can activate FLC mode to climb or rejoin a descent path that is below the current altitude.

In some instances, the autoland module 214 is configured to cause the generation of one or more displays at a display screen, such as the display 120 of the CDU 106. FIGS. 4A through 6B, 8 and 11A-11B illustrate example display screens 302, 402, 502 of the display 120 of the CDU 106, the PFD 102, and/or the MFD 104. As described above, the outland autoland module 214 is configured to cause the display information related to routing the aircraft to the FAF, which is described in greater detail herein.

Figure 4B:
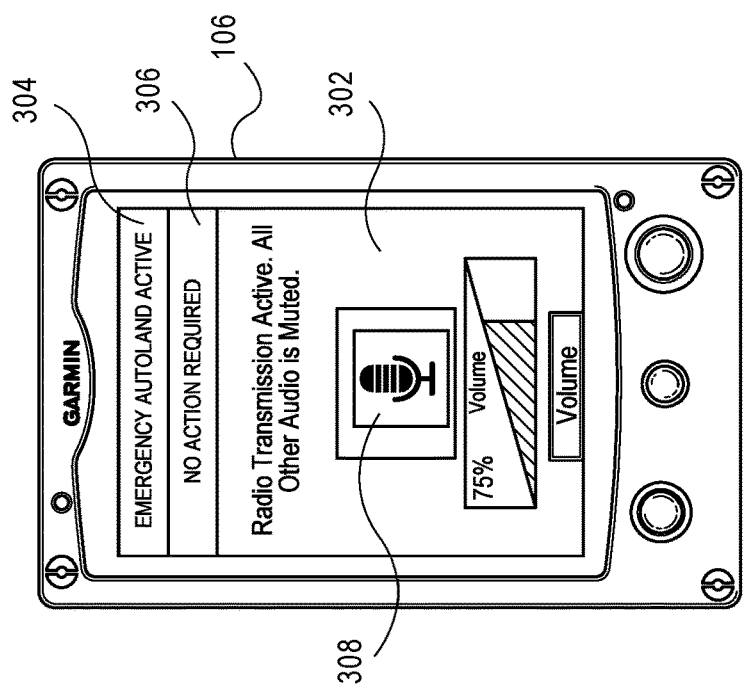
FIGS. 4A and 4B are illustrations of an avionics control and display unit (CDU) where various display attributes of navigational information are conveyed relating to routing of an aircraft during an emergency situation in accordance with an example implementation of the present disclosure.
Figure 4A:
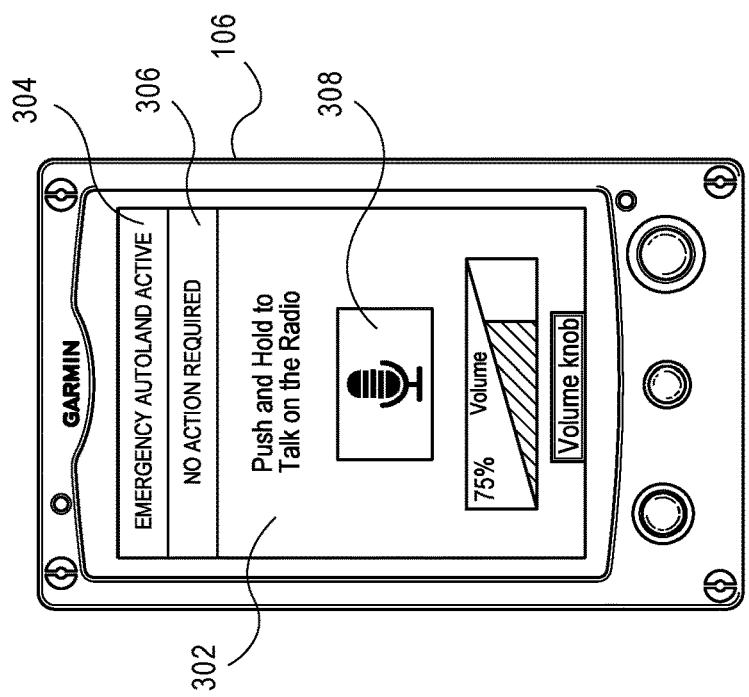

As shown in FIGS. 4A and 4B, the display screen 302 may display one or more textual notification banners configured to provide notifications to the user. For example, a first notification banner 304 may be configured to convey whether or not the autoland module 214 is active. A second notification banner 306 may be configured to convey whether or not a user action is required. The display screen 302 may also display one or more softkeys. For example, the display screen 302 may display a softkey 308 for activating a microphone for radio transmission. The display screen 302 may also display text and/or graphic user instructions for operating the microphone (e.g., volume control, push and hold to talk, etc.), as illustrated in FIG. 4B.

Figure 5A:
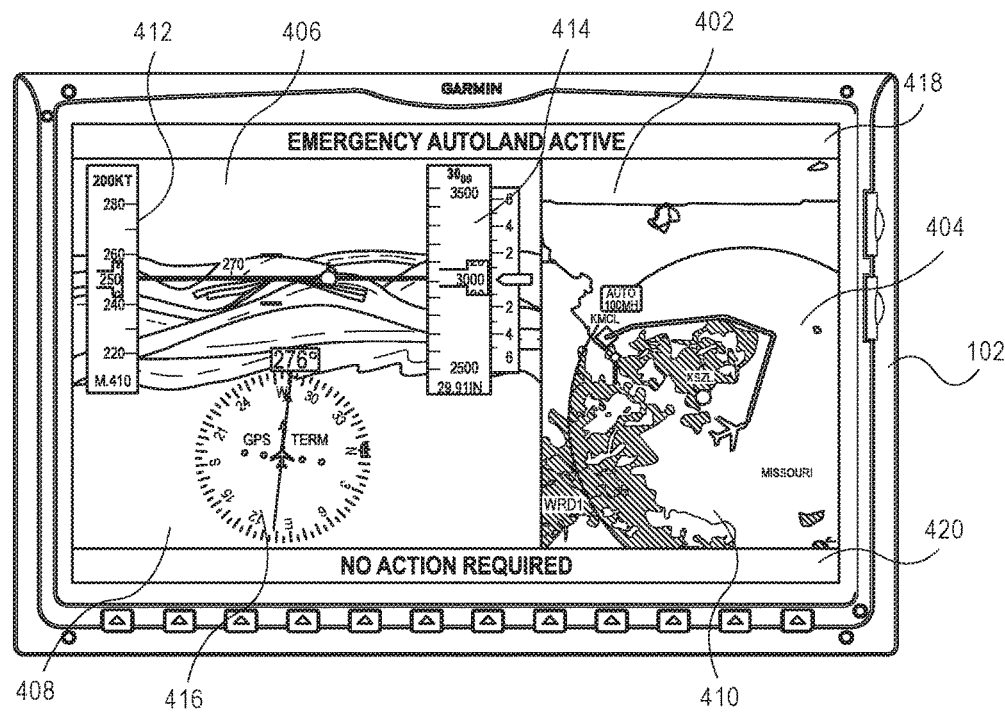
FIGS. 5A and 5B are illustrations of a primary flight display (PFD) where various display attributes of navigational information are conveyed relating to routing of an aircraft during an emergency situation in accordance with an example implementation of the present disclosure.
Figure 5B:
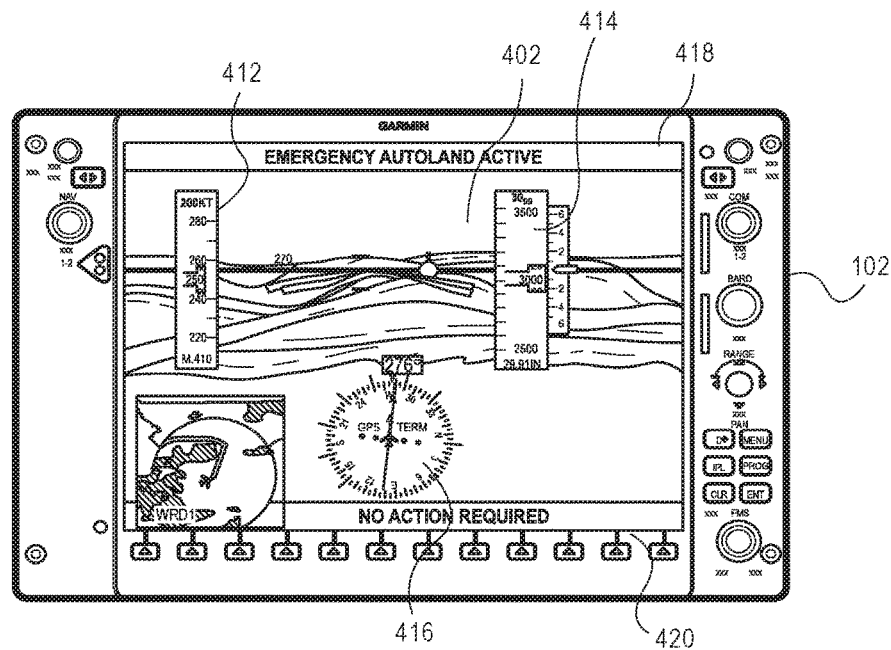

As shown in FIGS. 5A and 5B, the display screen 402 may display navigation information, which may be retrieved via the integrated avionics systems components, that represent information describing operation of the aircraft (e.g., navigation routes, moving maps, engine gauges, weather radar, ground proximity warning system (GPWS) warnings, traffic collision avoidance system (TCAS) warnings, airport information, and so forth). In implementations, the navigation information can be displayed as one or more maps. In one or more implementations, the navigation information can include a first map 404 (e.g., map graphic) that is configured to convey the route (e.g., flight plan) of the aircraft to the FAF. For example, the first map 404 may display a topographical representation of the route the aircraft may traverse to reach the FAF. The first map 404 may be configured to continually update at predetermined time intervals such that the graphical representation reflects the aircraft's location relative to the FAF. In some implementations, the first map 404 can be configured to convey landmarks (e.g., state lines, roads/highways, cities, etc.) located on the route. The first map 404 can also display the route of the aircraft relative to weather radar data WRD1.

The navigation information can also include a second map 406 (e.g., map graphic) that is configured to convey a map region pertinent to navigation of the aircraft. For example, the second map 406 may display graphical representations of an area that the aircraft is traversing. The second map 406 may be configured to continually update at predetermined time intervals such that the graphical representations reflect the area being traversed with respect to movement of the aircraft (i.e., a moving map).

In some embodiments, the maps 404, 406 can be displayed on different display panes 408, 410, as illustrated in FIG. 5A. In other embodiments one or more of the maps 404, 406, can be displayed on a display insert panel, as illustrated in FIG. 5B.

In one or more implementations, the display screen 402 may display one or more graphic and/or text indicator configured to convey information describing the route and/or operation of the aircraft. Indicators can include, but are not necessarily limited to airspeed tape 412, altimeter 414, horizontal situation indicator 416, and so forth. The display screen 402 can also display textual notification banners configured to provide notifications to the user. For example, a first notification banner 418 may be configured to convey whether or not the autoland module 214 is active. A second notification banner 420 may be configured to convey whether or not a user action is required.

Figure 6A:
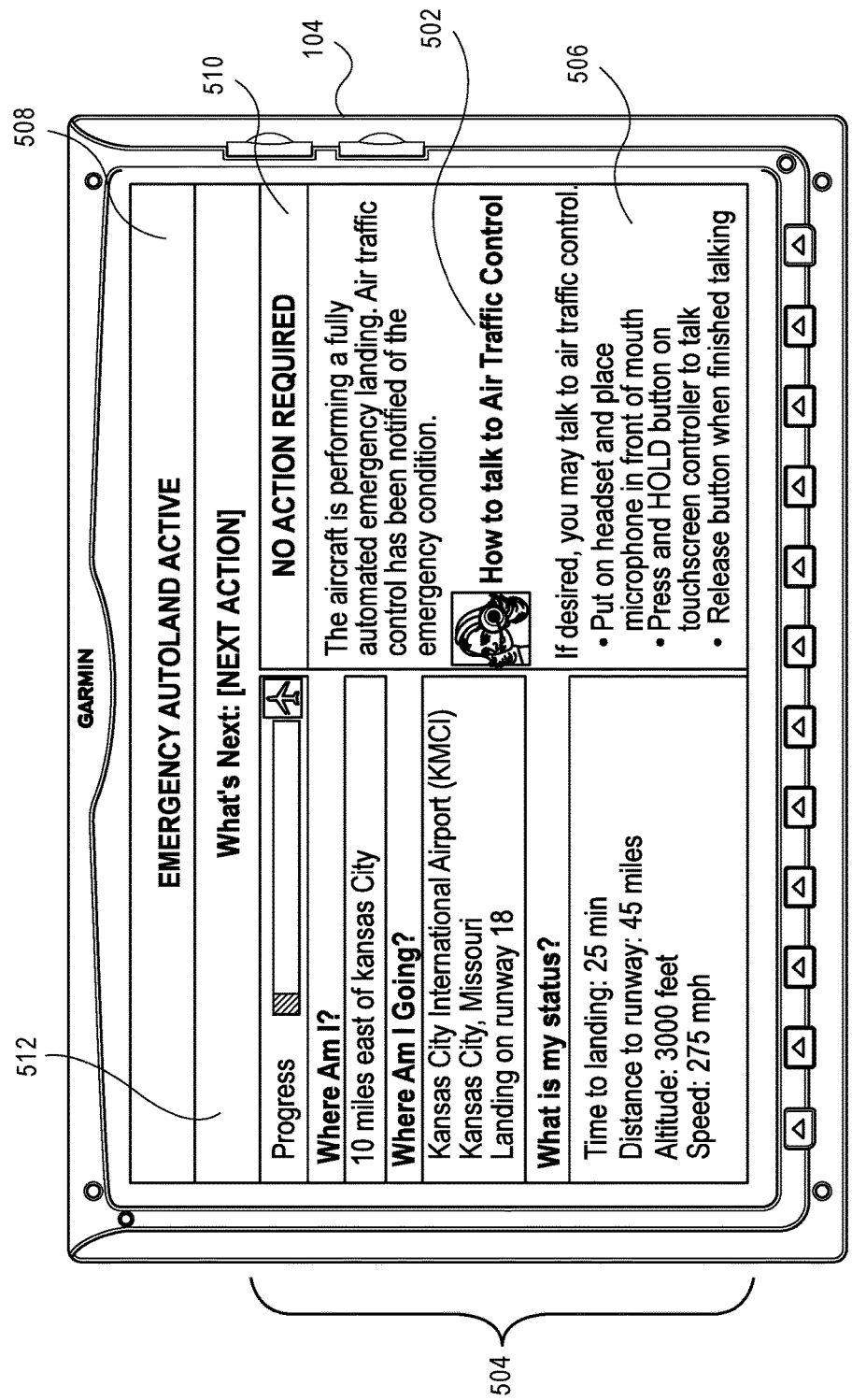
FIGS. 6A and 6B are illustrations of a multifunction display (MFD) where various display attributes of navigational information are conveyed relating to routing of an aircraft during an emergency situation in accordance with an example implementation of the present disclosure.
Figure 6B:
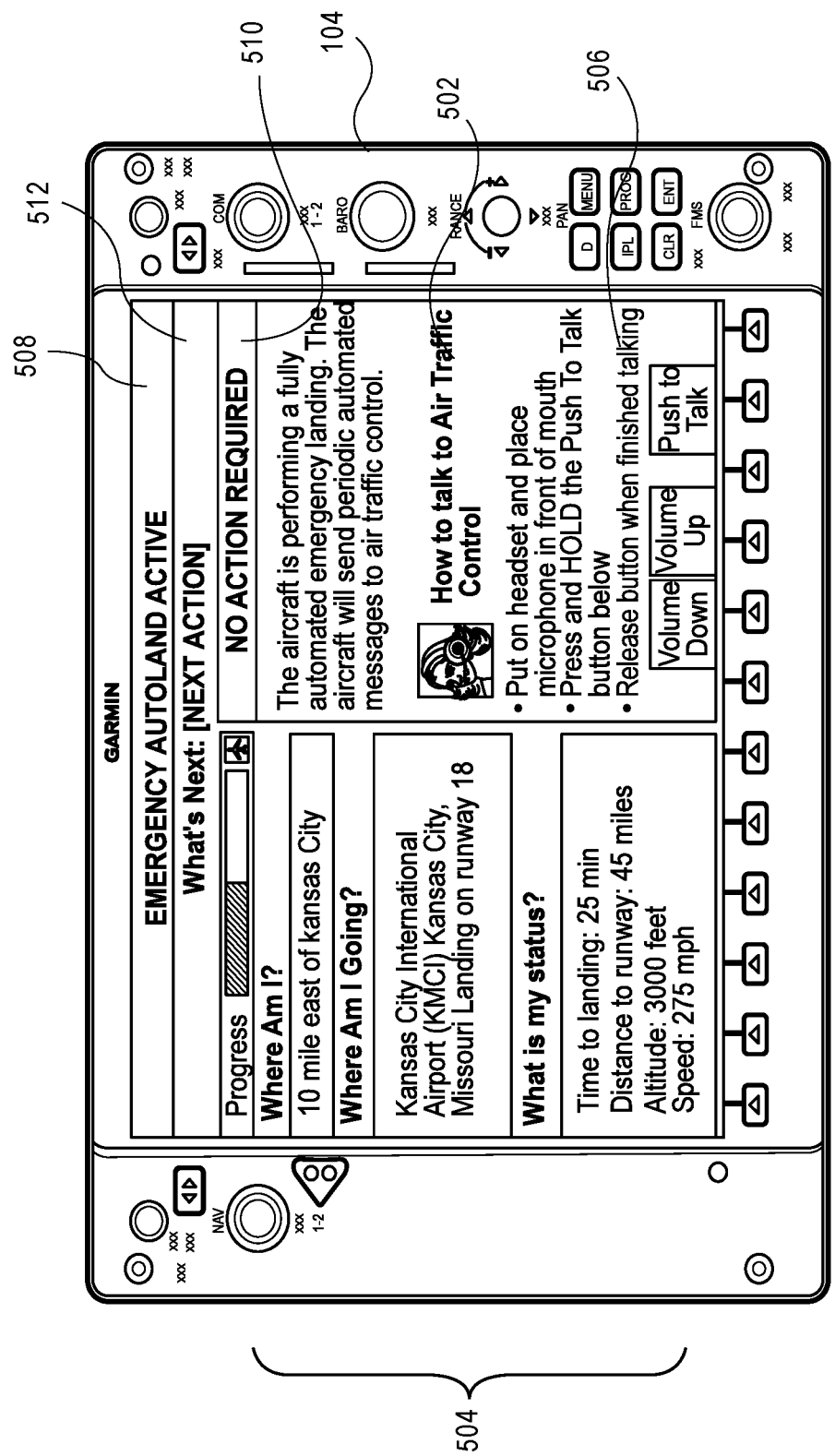
Figure 8:
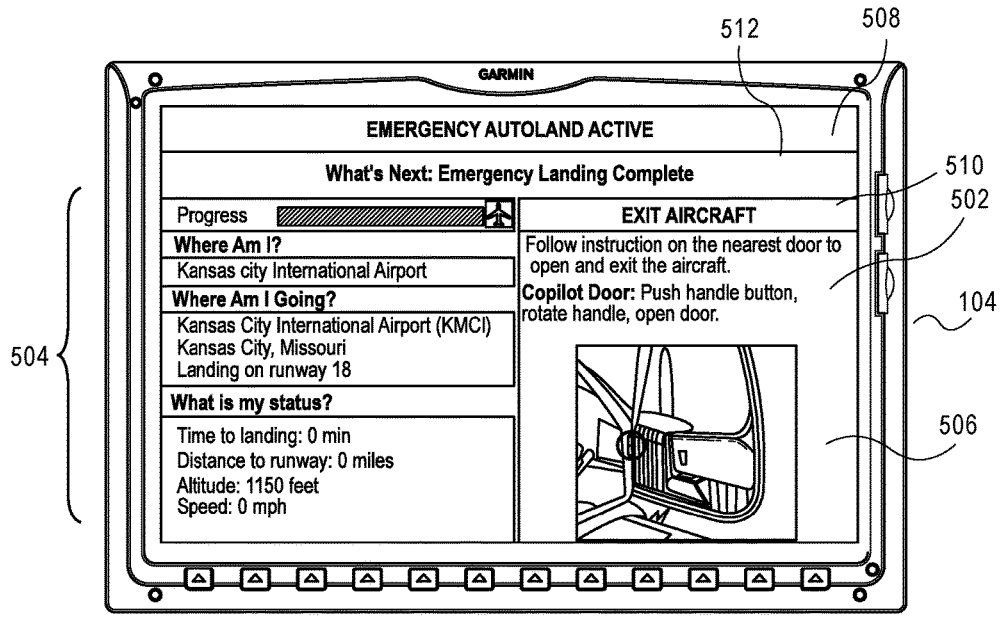
FIGS. 8 and 9 are illustrations of a multifunction display (MFD) where various display attributes of status information, such as status information illustrated in FIG. 7, and instructional information to convey to a passenger in the event of an emergency in accordance with an example implementation of the present disclosure.

As shown in FIGS. 6A through 6B, the display screen 502 may display graphics and/or text that represent information describing the operation of the aircraft. For example, the text may include status information SI1 504, which may be retrieved via the integrated avionics systems components, that represent information describing operation of the aircraft (e.g., navigation routes, moving maps, engine gauges, weather radar, ground proximity warning system (GPWS) warnings, traffic collision avoidance system (TCAS) warnings, airport information, and so forth). In one or more implementations, the status information SI1 504 can include text configured to convey dynamic information about the route of the aircraft, the FAF (e.g., name of airport, location of airport, runway number), and/or the status of the aircraft (e.g., speed, altitude, distance to runway, time to landing, etc.), as illustrated in FIGS. 6A and 6B. FIG. 7 illustrates example status information that can be conveyed at one or more displays in accordance with the present disclosure. The display screen 502 can also include text and/or graphics representing dynamic instructions 506 for the user. For example, the text and/or graphical instructions 506 can assist the user in communicating with air traffic control (e.g., as described with reference to FIGS. 6A and 6B), exiting the aircraft upon landing (e.g., as described with reference to FIG. 8), fuel management instructions (e.g., as described with reference to FIG. 9), and so forth.

The display screen 502 can also display one or more textual notification banners configured to provide notifications to the user. For example, a first notification banner 508 may be configured to convey whether or not the autoland module 214 is active. A second notification banner 510 may be configured to convey whether or not a user action is required. A third notification banner 512 can be configured to convert the next action that the aircraft may take. Example next actions (e.g., instructional information) that can be conveyed by the third textual banner 512 are illustrated in FIG. 10. The notifications may be accompanied by haptic (e.g., vibration alerts) notifications, aural (e.g., beeps or spoken text) notifications, or communicated via another appropriate means to the user. In implementations, one or more of the notification banners 508, 510, 512 can be configured to correspond with the dynamic instructions 506. For example, upon autoland module 214 activation, an instruction to the user may indicate that emergency autoland is active and that air traffic control has been notified of the emergency, while a corresponding second notification banner can be configured to convey that no user action is required (as described with reference to FIGS. 6A and 6B).

Figure 9:
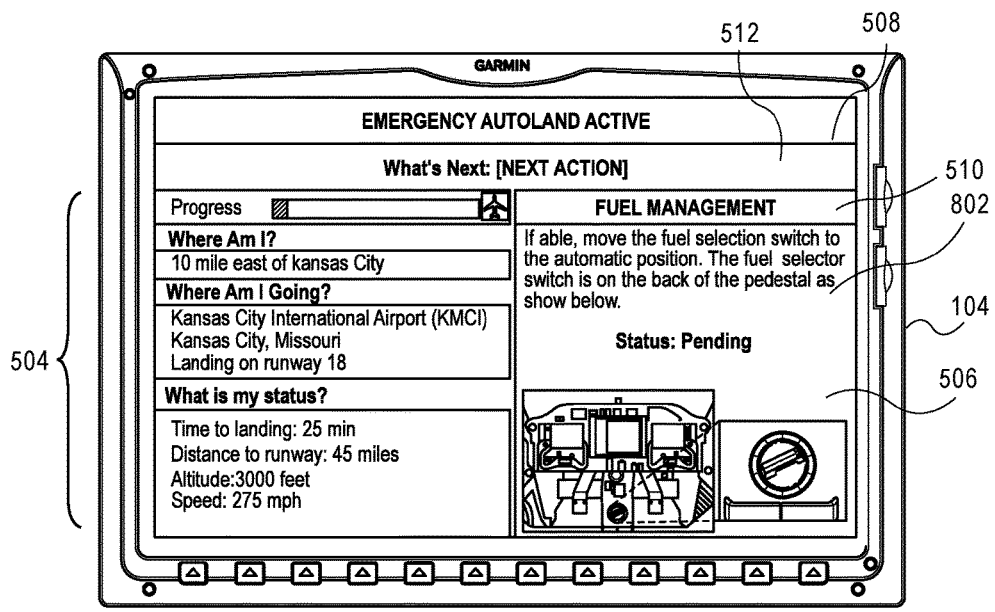

In one or more implementations, the dynamic instructions 506 can represent fuel management instructions (e.g., as described with reference to FIG. 9). Example fuel management instructions 802 can include, but are not necessarily limited to a one-time instruction to set the fuel selector to auto mode, periodic instructions to switch fuel tanks, and so forth. The fuel management instructions 802 may be accompanied by the second notification banner 510 configured to convey that fuel management is required. The display screen 502 can also display graphic and/or text configured to convey the status of the fuel management instruction (e.g., pending, satisfactorily completed, etc.) to the user.

Figure 11B:
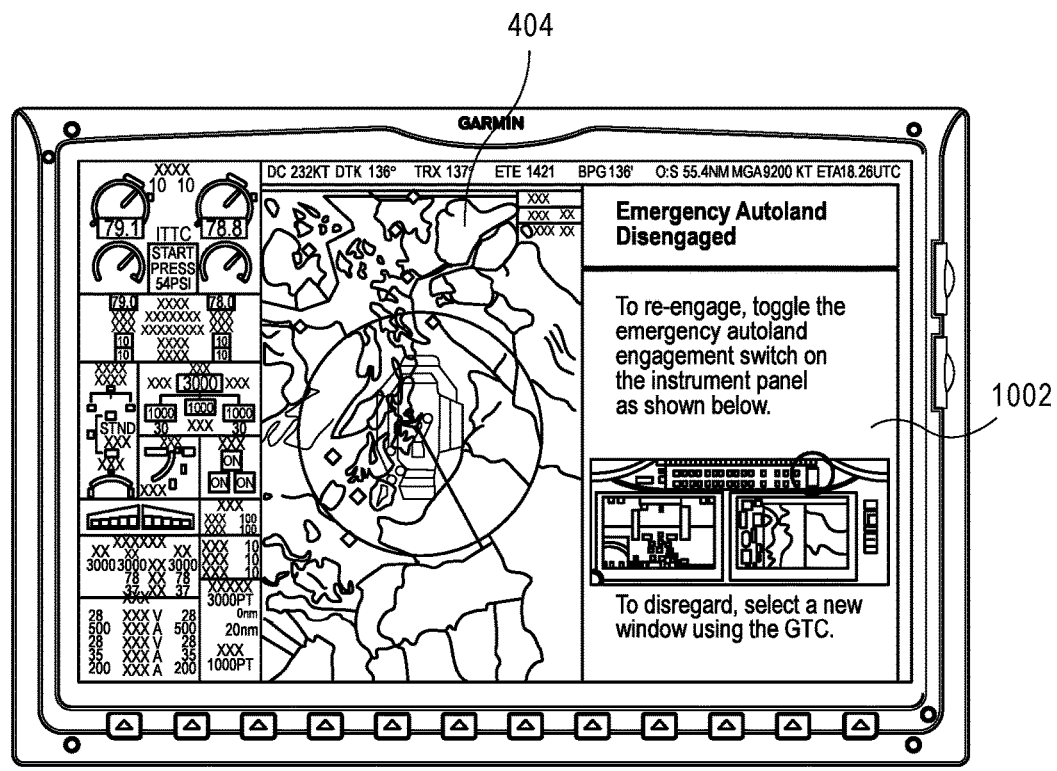

As shown in FIGS. 11A and 11B, the display screen 502 may display graphical and/or text alerts 1002 configured to convey failure and/or disengagement of the autoland module 214. FIG. 11A includes an example screen shot of display screen 502 indicating emergency failure of the autoland module 214. FIG. 11B includes an example screen shot of display screen 502 (FIG. 11A) indicating normal disengagement of the autoland module 214. The alert 1002 may be accompanied by text and/or graphics configured to convey an instruction to the user (e.g., instructions for re-engaging the autoland module 214), as illustrated in FIG. 11A.

In exemplary implementations, display screen 302, 402, 502 comprise exemplary display screens of the CDU 106, the PFD 102, and the MFD 104, respectively. However, it is contemplated that any of display screens 302, 402, 502, and/or the text and/or graphics generated thereon, may be generated at any of the CDU 106, the PFD 102, and/or the MFD 104. The display screens 302, 402, 502 may comprise a single display plane (as described with reference to FIGS. 4A and 4B), a plurality of display panes 408, 410 (e.g., as described with reference to FIG. 5A) and/or include one or more display insert panels (e.g., as described with reference to FIG. 5B).

In one or more implementations, the system 100 can be configured to issue one or more aural communications to the user and/or the air traffic controller. In one or more implementations, the autoland module 214 can configure an audio system of the aircraft to a predefined configuration. For example, the autoland module 214 can actuate and/or disable one or more audio system components (e.g., audio sources, radio sources, transponder, speakers, intercom, etc.)

to allow automated (e.g., text to speech) communication with the user(s) and/or air traffic control. In implementations, the autoland module 214 can cause the audio system to issue one or more automated aural communications to provide status updates to the user. FIG. 12 illustrates example status updates in accordance with one or more implementations of the present disclosure. The autoland module 214 can also configure the audio system for automated and/or user initiated communication with air traffic control. For example, the autoland module 214 can select a radio for communication over an emergency frequency. The autoland module 214 can be configured to cause display (e.g., via one or more of the display screens of the CDU 106, the PFD 102, and the MFD 104, as described above) of the appropriate air traffic control frequency to the user, allowing the user to manually contact and communicate with air traffic control. In another implementation, if no action is taken by the user, the autoland module 214 can cause the processor 202 to automatically tune the radio and broadcast on the universal emergency frequency and/or the local traffic frequency for the FAF. The autoland module 214 may also be configured to cause display of instructions to the user for disabling the automatic broadcasting to allow for manual communication. The autoland module 214 can also disengage one or more audio controls (e.g., bezels, softkeys, audio panel reversion switches, etc.) to enable automated communication. Upon landing, the autoland module 214 can control the radio to broadcast on one more appropriate frequencies (tower, approach, center, emergency, etc.) that the aircraft has landed, that the aircraft is on the runway, that the runway is closed, combinations thereof, and the like.

In one or more implementations, the autoland module 214 can actuate the transponder to alert air traffic control that the aircraft is experiencing an emergency. For example, the autoland module 214 can adjust the transponder code from a standard code (e.g., 1200) to an emergency code (e.g., 7700, a code specific to autoland use, Automatic Dependent Surveillance Broadcast (ADSB) subfields populated with emergency priority status, etc.). The transponder can remain on the emergency code for a predetermined time interval (e.g., 15 seconds). During the predetermined time interval, the user can manually change the code. If the user does not manually change the code within the predetermined time interval, the autoland module 214 can cause the transponder to adjust back to the previously entered code. If the transponder was previously set to the standard code (e.g., 1200), then the autoland module 214 can cause the transponder to adjust to the lost communication code (e.g., 7600), following the predetermined time interval, unless the user manually selects a code. In implementations, the transmission of the emergency code can be manually disabled by a user prior to engaging the autoland module 214. The user can then manually select the transponder codes as desired.

In some embodiments, the autoland module 214 can make a satellite connection to allow for communication during an emergency situation. For example, the module 214 can make a satellite connection with a support center that can communicate with the aircraft cabin. In some situations, the autoland module 214 can be configured to automatically activate the satellite connection based upon the engagement of the emergency autoland module 214 and/or detection of an emergency event (e.g., cabin depressurization, loss of altitude, etc.).

Example Processes

Figure 13:
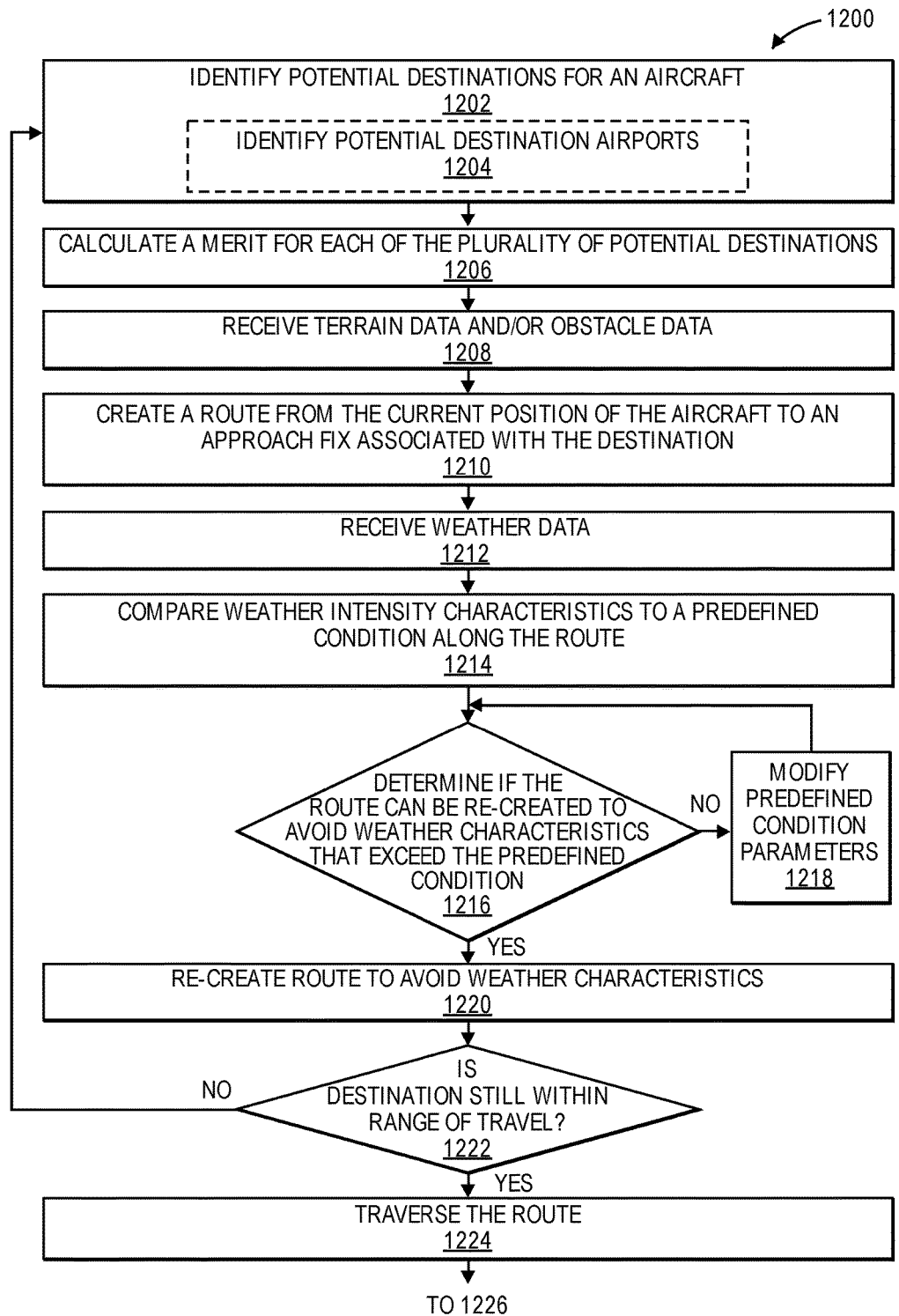
FIG. 13 is an example flow diagram illustrating an example process for autolanding an aircraft in an emergency situation in accordance with an example implementation of the present disclosure.
Figure 13:
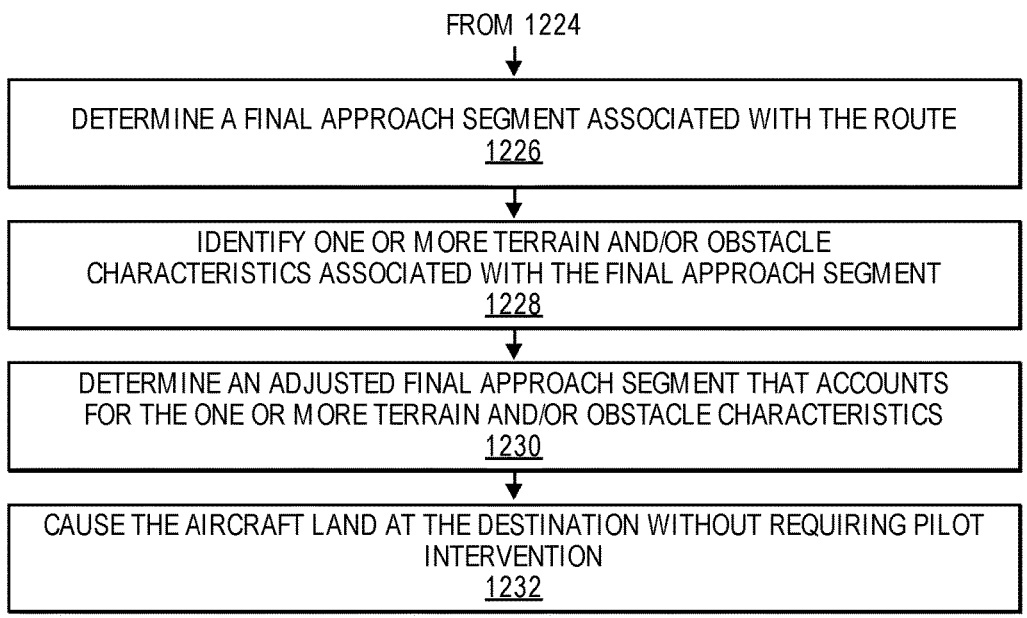

FIG. 13 depicts an example process 1200 for autolanding an aircraft in an emergency situation utilizing an integrated avionics system, such as the integrated avionics system 100 described above. As shown in FIG. 13, a plurality of potential destinations for an aircraft are identified (Block 1202). In some embodiments, a plurality of potential destination airports are identified (Block 1204). However, potential destinations can also include an airport location, terrain features (e.g., fields, landing fields, other open areas), bodies of water (e.g., lakes, seaports, etc.), and so forth. In some embodiments, airports within a range of travel of the aircraft are identified based upon a determined endurance of the aircraft. For example, the autoland module 214 can cause the processor 202 to execute an endurance process (e.g., as described with reference to FIG. 13) to determine the aircraft's endurance based on usable fuel onboard the aircraft (endurance=current fuel/current total fuel flow). The autoland module 214 can then use one or more airport selection processes (e.g., as described with reference to FIG. 15) to identify potential airports within the range of travel of the aircraft, as described. For example, the autoland module 214 can cause the processor 202 can identify any airports within a preselected distance (e.g., 200 to 500 miles) from the aircraft. If there are no potential destinations within the range of travel of the aircraft, the processor 202 can identify and select potential destinations outside of the range of travel such as the closest potential destination (e.g., the closest airport), the last loaded origin, the last loaded destination, previously available destinations, and so forth. In some implementations, the autoland module 214 can cause the processor 202 to eliminate any airports that are not appropriate candidates for landing based on one or more adverse landing characteristics. Adverse landing characteristics can include, but are not necessarily limited to: airports that do not have at least one hard surface runway, airports that are heliports only, airports that do not have at least one acceptable approach (e.g., GPS approach to a runway with vertical guidance), and so forth. In some implementations, the system 100 can also incorporate weather data (e.g., METAR, Terminal Doppler Weather Radar (TDWR), terminal aerodrome forecast (TAF), etc.) received from each airport (or from a nearby airport should weather data not be available) in selecting potential airports. For example, the processor 202 can treat unfavorable weather conditions as an adverse landing characteristic and eliminate those airports from the potential airports.

A merit is calculated for each of the plurality of potential destinations (Block 1206). For example, the autoland module 214 can cause the processor 202 to identify a merit value for each airport runway using one or more merit processes (e.g., as described with reference to FIG. 16). In some implementations, the processor can identify one or more runway merit values for a runway corresponding with each airport. For example, the autoland module 214 can cause processor 202 to calculate one or more merits for each runway based on a variety of runway attributes, as described above. Runway attributes can include, but are not necessarily limited to: final approach coarse alignment with the runway, runway characteristics (e.g., runway length, runway width, approach vertical angle (e.g., flight path angle), gradient, etc.), weather conditions (e.g., weather rating (e.g., IFR, VFR, etc.), gust, precipitation level, precipitation type, etc.), attributes specific to the airport (e.g., airport with a tower, airports that anchor class B airspace, exclusively military airports, etc.), travel time to airport (ETE), and so forth. The autoland module 214 can cause the processor 202 can calculate a merit value for each attribute. For example, the processor 202 can assign each attribute a merit value in the range of −1.0 to 1.0, with 1.0 representing an ideal runway. Negative merit values can be considered to be out of limits. In some implementations, the processor 202 can determine a final approach course alignment runway merit for a runway corresponding to each potential destination airport. For example, the processor 202 can calculate the degrees of misalignment of the aircraft with the runway. In some implementations, the processor 202 can eliminate runways that exceed a preselected maximum misalignment threshold (e.g., 25 degrees to 35 degrees of misalignment). The processor 202 can also determine an airport attribute runway merit for each potential destination airport. For example, the processor 202 can assign a high merit value to airports with towers, as the presence of a tower can indicate that the airport has emergency facilities. The processor 202 can assign low merit values to airports that anchor class B airspace and/or exclusively military airports. The processor 202 can also determine a travel time runway merit for a runway corresponding to each potential destination airport. In example implementations, the processor 202 can calculate time to runway using groundspeed along a selected path from the wind triangle based on wind speed and/or wind direction.

The autoland module 214 can then determine the total merit for each runway. In embodiments, the autoland module 214 can determine a total merit for each runway by applying a predetermined weighting factor (K) to each runway merit (M), as described above. The processor 202 can then determine which runway has the highest total merit (e.g., highest Σ(K*M)).

In some implementations, the autoland module 214 can incorporate route weather data in determining the total merit for each destination. For example, the autoland module 214 can cause the processor 202 to analyze the weather data and/or forecast data for one or more weather intensity characteristics. Weather intensity characteristics can include, but are not necessarily limited to: precipitation level, precipitation type (e.g., rain, snow, sleet, etc.), atmospheric conditions (e.g., wind speed, wind direction, temperature, etc.), storm attributes (e.g., storm top elevation, reflectivity, vertically integrated water, probability of hail, probability of severe hail, maximum hail stone diameter size, speed and/or direction of storm movement, tornadic activity, etc.), weather conditions (e.g., weather severity, visibility, etc.), and so forth. The autoland module 214 can cause the processor 202 to compare the weather intensity characteristics to a predefined condition (e.g., a predefined severity and/or intensity threshold). For example, the autoland module 214 can cause the processor 202 to compare storm severity to predefined weather severity levels (e.g., low, medium, high, etc.), and identify weather severity areas. If the storm severity of a weather area exceeds one or more of the predefined severity levels, the autoland module 214 can cause the processor 202 to adjust the airport merit accordingly. For example, the processor 202 can create a buffer area around weather areas of predefined severity levels, and downgrade runways that require passing through those areas. The processor 202 can downgrade (e.g., assess a penalty) to runways that require a route passing through a preselected radius (e.g., approximately five miles to approximately 15 miles) of a high severity weather area (e.g., areas depicted on a NEXRAD map as red areas). The processor 202 can also eliminate (e.g., assign negative M) to runways that require a route passing through a preselected radius (e.g., approximately two miles to approximately four miles) of a high severity weather area (e.g., NEXRAD red areas). In some implementations, the processor 202 can increase the minimum distance (e.g., increase the preselected radius) from a high severity weather area (e.g., NEXRAD red areas) based on the size of the area. The processor 202 can also be configured to identify gradient changes in weather intensity characteristics. For example, the processor 202 can identify areas that change from a low severity area to a medium severity area within a specified distance (e.g., approximately one mile) and treat those areas as high severity areas. If a route cannot be determined through the weather and/or no routes can be determined due to weather (e.g., all routes contain weather that prohibits routing), the processor 202 can expand the tolerance for the predefined condition (e.g., expand the tolerance for weather severity) until a route can be determined.

As shown in FIG. 13, a destination is selected based upon the merit (Block 1206). For example, the autoland module 214 can cause the processor 202 to select the airport with the highest runway total merit as the destination. If the processor 202 is unable to identify an optimal runway (e.g., a runway with positive total merit), the processor 202 can select the runway with the highest negative merit. In another example, the user can manually select a destination airport and/or runway from the potential airports via the touch screen 210. In some embodiments, when no runways are within range of the aircraft (e.g., based on determined aircraft endurance), the module 214 will assign the highest merit to the potential destination with the shortest ETE, ignoring all other merits.

Terrain data and/or obstacle data is received (Block 1208). In embodiments, the terrain data can include at least one terrain characteristic and the obstacle data can include at least one obstacle characteristic. The processor 202 can operate on the aircraft route calculation process to analyze cartographic data for terrain characteristics and/or obstacle characteristics. Terrain characteristics can include, but are not necessarily limited to elevation, horizontal dimension of the land surface, surface characteristics (e.g., bodies of water, permanent ice and/or snow, etc.), and so forth. Obstacle characteristics can include buildings, power lines, other aircraft, and so forth.

A route is created from the current position of the aircraft to an approach fix associated with the destination (Block 1210). The processor 202 can execute one or more aircraft route calculation processes (e.g., as described with reference to FIG. 17) to determine a route between the current aircraft position and the approach fix. The approach fix can include, but is not necessarily limited to an FAF, an IAF, a point on a published approach, an arbitrary fix point that the system 100 selects to enable the aircraft to land on the selected runway (e.g., a visual approach fix, etc.), and so forth. For example, the autoland module 214 can cause the processor 202 to create a FAF for the destination airport. The processor 202 can then create a route from the current position of the aircraft to the FAF. In embodiments, the processor 202 can create a route from the current position of the aircraft to the FAF that accounts for the terrain and/or obstacle characteristics. The processor 202 can create a route that avoids terrain and/or obstacle characteristics that exceed a predetermined condition. In some embodiments, the processor 202 can compare the terrain characteristics and/or obstacle characteristics with a predefined elevation and/or altitude threshold. For example, the processor 202 can identify elevation and/or altitude of a land region, and create a waypoint at a preselected altitude (e.g., 1000 ft.), above the highest terrain. In other embodiments, the processor 202 can determine a direct route between the current position and the destination where no terrain characteristics or obstacles are present. For example, the processor 202 can create a direct route at the present altitude between the current position and the FAF.

In some implementations, weather data is received (Block 1212). The weather data can include at least one weather intensity characteristic and the terrain data can include at least one terrain characteristic. For example, the processor 202 can operate on the aircraft route calculation process to analyze weather data (e.g., weather radar, XM, datalink weather, icing data) and/or forecast data (e.g., Winds and Temperatures Aloft Forecast data, turbulence data, windshear data, NEXRAD data, etc.) for weather intensity characteristics. Weather intensity characteristics can include, but are not necessarily limited to: precipitation level, precipitation type (e.g., rain, snow, sleet, etc.), atmospheric conditions (e.g., wind speed, wind direction, temperature, etc.), storm attributes (e.g., storm top elevation, reflectivity, vertically integrated water, probability of hail, probability of severe hail, maximum hail stone diameter size, speed and/or direction of storm movement, tornadic activity, etc.), and so forth.

In some implementations, the weather intensity characteristic is compared to a predefined condition along the route (Block 1214). For example, the autoland module 214 can cause the processor 202 to compare whether intensity characteristics to a predefined severity and/or intensity threshold. In some implementations, the system determines if the route can be re-created to avoid weather characteristics that exceed the predefined condition (Decision Block 1216). If the route cannot be re-created (NO to Decision Block 1216), the parameters defining the predefined condition are modified until the route can be re-created (Block 1218). For example, the processor 202 can expand the tolerance for the predefined condition (e.g., expand the tolerance for weather severity) until a route can be determined based upon the expanded tolerance for the predefined condition(s). If the route can be re-created (YES to Decision Block 1216), then the route is re-created to avoid weather intensity characteristics that exceed the predefined condition (Block 1220). The autoland module 214 can cause the processor 202 to create one or more waypoints associated with the weather intensity characteristics. For example, the processor 202 can create one or more waypoints to avoid severe weather areas and/or predicted severe weather areas, as described above. As the aircraft passes a waypoint, the processor 202 can operate on the aircraft route calculation process to dynamically analyze weather data and/or forecasting data of the re-created course and create waypoints until no weather intensity characteristics exceeding the predefined condition remain on the route to the approach fix.

In some implementations, the system 100 determines if the destination is still within the range of travel based upon the determined endurance and the weather intensity characteristics and/or terrain characteristics (Decision Block 1222). For example, the autoland module 214 can cause the processor 202 to determine if the airport is still within the preselected distance (e.g., 200 to 500 miles) from the aircraft based on the re-calculated route. If the destination is no longer within the range of travel (NO from Decision Block 1222), destinations are re-identified within the range of travel (Block 1202). If the airport is still within the range of travel (YES from Decision Block 1222), to the route is traversed (Block 1224). For example, the autoland module 214 can cause the processor 202 to replace the flight plan's previous route with the newly calculated route and/or re-created route. In one or more implementations, the autoland module 214 can cause the flight director, autopilot system, and/or navigation system to actuate one or more modes of operation to traverse the route, as described above. For example, the autoland module 214 can cause the autopilot system to actuate the vertical navigation mode (VNAV) and/or the lateral navigation mode (LNAV) to traverse the route from the current position of the aircraft to the waypoint(s) and/or the FAF. The autoland module 214 can also cause the autopilot system to actuate a flight level change (FLC) mode and/or an altitude hold mode (ALT) to achieve and/or maintain desired airspeed and/or altitude while traversing the route.

In one or more embodiments, a final approach segment associated with the route is determined (Block 1226). For example, the final approach segment can be determined using one or more final approach segment determination processes (e.g., as described with reference to FIG. 18) and/or techniques (e.g., as described with reference to FIGS. 3A through 3F). In some implementations, one or more terrain and/or obstacle characteristics associated with the final approach segment are identified (Block 1228). For example, a clearance detection plane can be determined by offsetting the FAF altitude by a configurable FAF clearance amount and determining a second glide path angle ($\theta_2$) associated with the $GPIP_1$. The module 214 can then cause the processor 202 to evaluate terrain and/or obstacle data for intrusion against the detection plane (e.g., identify one or more terrain characteristics and/or obstacle characteristics with an elevation and/or altitude that exceed that of the detection plane). An adjusted final approach segment is determined that accounts for the terrain and/or obstacle characteristics (Block 1230). In embodiments, the module 214 causes the processor 202 to determine a vertical path adjustment for the approach fix. For example, the module 214 causes the processor 202 to determine a GPIP lateral offset associated with the terrain characteristic and/or obstacle characteristic, and an associated offset glide path intercept point ($GPIP_2$). The processor 202 then adjusts the final approach segment by adjusting the FAF altitude and/or the MAP altitude based on the $GPIP_2$ and the original glide path angle ($\theta_1$).

The system can cause the aircraft to land at the destination without requiring pilot intervention (Block 1232). For example, the autoland module 214 can cause the processor 202 to execute one or more landing processes, flare processes, and/or elevation processes to land the aircraft as described above.

In implementations, the autoland module 214 engages one or more components and/or systems of the aircraft that are internal and/or external to the system 100 for traversing the route and/or landing the aircraft. For example, the autoland module 214 can cause the CDU 106 to engage one or more of the autopilot system, the flight director, autothrottle, ESP, EDM, braking system, aerodynamic control, engine, and so forth.

Figure 14:
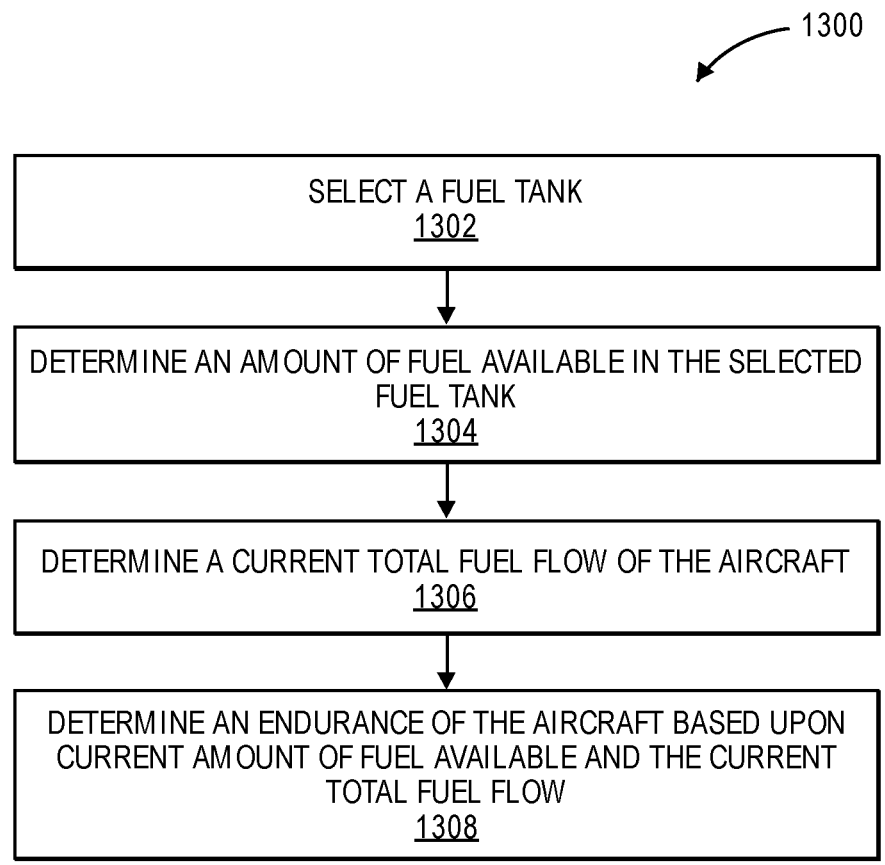
FIG. 14 is an example flow diagram illustrating an example process for determining an endurance of an aircraft in accordance with an example implementation of the present disclosure.

FIG. 14 illustrates an example process 1300 for determining an endurance of an aircraft utilizing an integrated avionics system, such as the integrated avionics system 100 described above. As shown in FIG. 14, a fuel tank of the aircraft is selected (Block 1302). In example implementations, the aircraft has manually selected tanks for fuel usage, and the avionics does not know which tank is selected, the processor 202 may utilize the tank with the least fuel for the endurance calculation. In another example, if the aircraft has manually selected tanks and the avionics knows which tank is selected, then the CDU 106 can utilize the selected tank for the endurance calculation. The current amount of fuel available in the selected tank is determined (Block 1304). As shown in FIG. 14, the aircraft's current total fuel flow is then determined (Block 1306). An endurance for the aircraft is determined based current amount of fuel available and the current total fuel flow (Block 1308). The endurance of the aircraft may be defined as the current fuel divided by the current total fuel flow.

Figure 15:
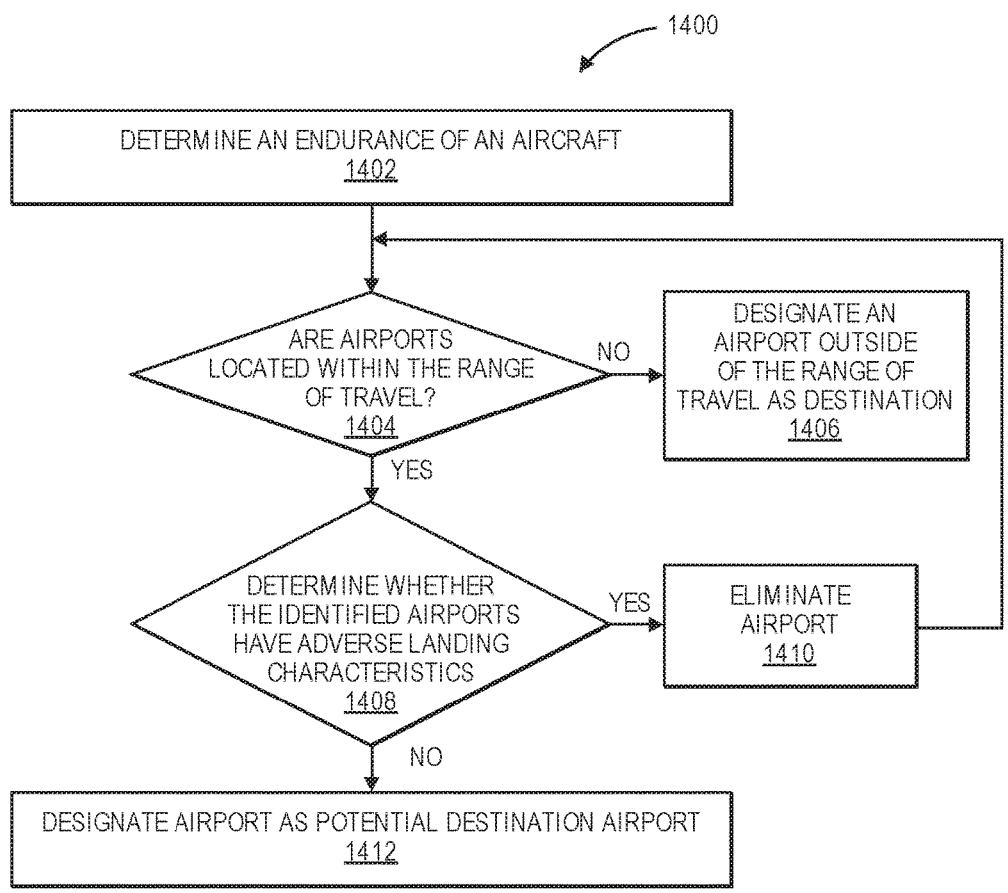
FIG. 15 is an example flow diagram illustrating an example process for identifying one or more airports within a range of travel of the aircraft based upon the endurance of the aircraft, as described in FIG. 14, in accordance with an example implementation of the present disclosure.

FIG. 15 illustrates an example process for identifying one or more airports within the range of travel of an aircraft 1400 utilizing an integrated avionics system, such as the integrated avionics system 100 described above. The endurance of the aircraft is determined (Block 1402). For example, the endurance of the aircraft can be determined using an endurance process, such as the endurance process illustrated in FIG. 14. The system 100 can determine whether or not airports are located within the range of travel based upon the endurance (Decision Block 1404). For example, the autoland module 214 can cause the processor 202 can identify any airports within a preselected distance from the aircraft. In some implementations, the potential airports can be those within approximately 200 to 500 miles (depending on plane type). If there are no airports within the range of travel of the aircraft (NO to Decision Block 1404), then an airport outside of the range of travel is selected as the destination airport (Block 1406). Airports outside of the range of travel can include, but are not necessarily limited to: the closest airport, the last loaded origin, the last loaded destination airport, previously available destination airports, and so forth. If there are airports located within the range of travel (YES to Decision Block 1404), a determination is made of whether the airports within the range of travel have any adverse landing characteristics (Decision Block 1408). For example, the processor 202 can eliminate airports that have one or more adverse landing characteristics. Adverse landing characteristics can include, but are not necessarily limited to: airports that do not have at least one hard surface runway, airports that are heliports only, airports that do not have at least one acceptable approach (e.g., GPS approach to a runway with vertical guidance), and so forth. In some implementations, the autoland module 214 can cause the processor to treat unfavorable weather conditions at the airport as an adverse landing characteristic. If the airport has one or more adverse landing characteristics (YES to Decision Block 1408), then the airport is eliminated from the potential destination airports (Block 1410). If the airport does not possess one or more adverse landing characteristics (NO to Decision Block 1408), then it is designated as a potential destination airport (Block 1412).

Figure 16:
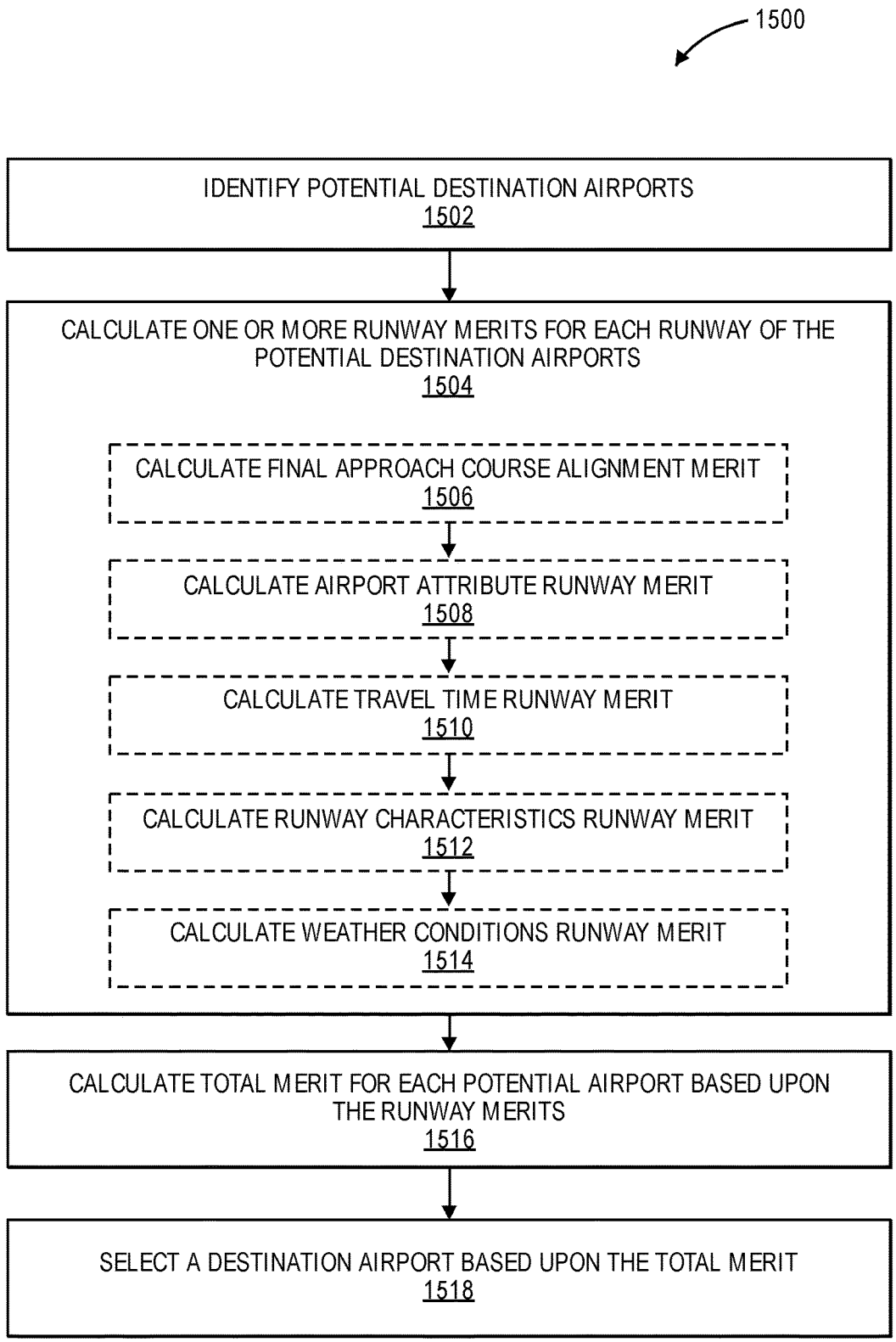
FIG. 16 is an example flow diagram illustrating an example process for selecting a destination airport based upon one or more merits associated with the identified airports, such as the airports identified utilizing the process illustrated in FIG. 15, in accordance with an example implementation of the present disclosure.

FIG. 16 illustrates an example process 1500 for selecting a destination airport utilizing an integrated avionics system, such as the integrated avionics system 100 described above. As shown in FIG. 16, potential destination airports are identified (Block 1502). For example, the potential destination airports can be identified using an airport selection process, such as the airport selection process illustrated in FIG. 15. One or more runway merits are calculated for each runway of the potential destination airports (Block 1504). For example, the autoland module 214 can cause processor 202 to calculate one or more merits for each runway based on a variety of runway attributes, as described above. Runway attributes can include, but are not necessarily limited to: final approach coarse alignment with the runway, runway characteristics (e.g., runway length, runway width, approach vertical angle (e.g., flight path angle), gradient, etc.), weather conditions (e.g., weather rating (e.g., IFR, VFR, etc.), gust, precipitation level, precipitation type, etc.), attributes specific to the airport (e.g., airport with a tower, airports that anchor class B airspace, exclusively military airports, etc.), travel time to airport (ETE), and so forth. The autoland module 214 can cause the processor 202 can calculate a merit value for each attribute. For example, the processor 202 can assign each attribute a merit value in the range of −1.0 to 1.0, with 1.0 representing an ideal runway. Negative merit values can be considered to be out of limits. In some implementations, a final approach course alignment runway merit is calculated for a runway corresponding to each potential destination airport (Block 1506). For example, the processor 202 can calculate the degrees of misalignment of the aircraft with the runway. In some implementations, the processor 202 can eliminate runways that exceed a preselected maximum misalignment threshold (e.g., 25 degrees to 35 degrees of misalignment). In some implementations, an airport attribute runway merit is calculated for each destination airport (Block 1508). For example, the processor 202 can assign a high merit value to airports with towers, as the presence of a tower can indicate that the airport has emergency facilities. The processor 202 can assign low merit values to airports that anchor class B airspace and/or exclusively military airports. In some implementations, a travel time runway merit is calculated for a runway corresponding to each potential destination airport (Block 1510). For example, the processor 202 can calculate time to runway using groundspeed along a selected path from the wind triangle based on wind speed and/or wind direction. In some implementations, a runway characteristics merit is calculated for a runway corresponding to each potential destination airport (Block 1512). In some implementations, a weather conditions merit is calculated for each potential destination airport (Block 1514). For example, the processor 202 can assign low merit values to airports with low visibility, high wind speeds, and so forth.

The autoland module 214 can then determine the total merit for each runway (Block 1516). In embodiments, the autoland module 214 can determine a total merit for each runway by applying a predetermined weighting factor (K) to each runway merit (M), as described above. The processor 202 can then determine which runway has the highest total merit (e.g., highest $\Sigma(K*M)$).

In some implementations, the autoland module 214 can incorporate route weather data in determining the total merit for each airport. For example, the module 214 can cause the processor 202 to analyze the weather data and/or forecast data for one or more weather intensity characteristics. Weather intensity characteristics can include, but are not necessarily limited to: precipitation level, precipitation type (e.g., rain, snow, sleet, etc.), atmospheric conditions (e.g., wind speed, wind direction, temperature, etc.), storm attributes (e.g., storm top elevation, reflectivity, vertically integrated water, probability of hail, probability of severe hail, maximum hail stone diameter size, speed and/or direction of storm movement, tornadic activity, etc.), and so forth. The autoland module 214 can cause the processor 202 to compare the weather intensity characteristics to a predefined condition (e.g., a predefined severity and/or intensity threshold. For example, the autoland module 214 can cause the processor 202 to compare weather intensity characteristics to predefined weather severity levels (e.g., low, medium, high, etc.), and identify weather severity areas. If the weather intensity characteristics of a weather area exceed one or more of the predefined severity levels, the autoland module 214 can cause the processor 202 to adjust the airport merit accordingly. For example, the processor 202 can create a buffer area around weather areas of predefined severity levels, and downgrade runways that require passing through those areas. The processor 202 can downgrade (e.g., assess a penalty) to runways that require a route passing through a preselected radius (e.g., approximately five miles to approximately 15 miles) of a high severity weather area (e.g., areas depicted on a NEXRAD map as red areas). The processor 202 can also eliminate (e.g., assign negative M) to runways that require a route passing through a preselected radius (e.g., approximately two miles to approximately four miles) of a high severity weather area (e.g., NEXRAD red areas). In some implementations, the processor 202 can increase the minimum distance (e.g., increase the preselected radius) from a high severity weather area (e.g., NEXRAD red areas) based on the size of the area. The processor 202 can also be configured to identify gradient changes in weather intensity characteristics. For example, the processor 202 can identify areas that change from a low severity area to a medium severity area within a specified distance (e.g., approximately one mile) and treat those areas as high severity areas. If a route cannot be determined through the weather and/or no routes can be determined due to weather (e.g., all routes contain weather that prohibits routing), the processor 202 can expand the tolerance for the predefined condition (e.g., expand the tolerance for weather severity) until a route can be determined.

A destination airport is selected based upon the total merit (Block 1518). For example, the autoland module 214 can cause the processor 202 to select the airport with the highest runway total merit as the destination airport. If the processor 202 is unable to identify an optimal runway (e.g., a runway with positive total merit), the processor 202 can select the runway with the highest negative merit. In another implementation, the user can manually select a destination airport and/or runway from the potential airports via the touch screen 210.

Figure 17:
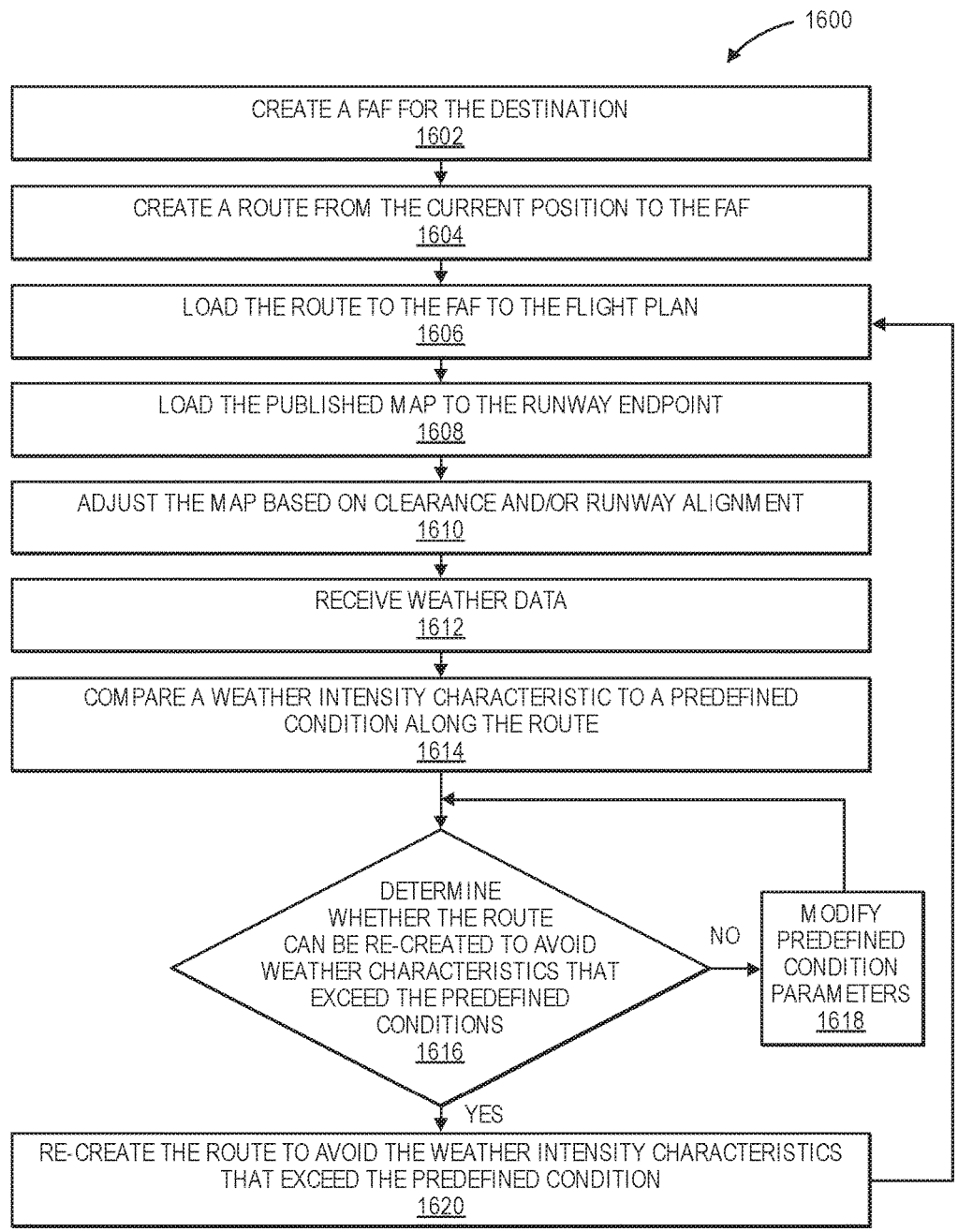
FIG. 17 is an example flow diagram illustrating an example process for creating a route from a current position of an aircraft to a destination airport, such as the destination airport determined utilizing the process described in FIG. 16, in accordance with an example implementation of the present disclosure.

FIG. 17 illustrates an example process 1600 for creating a route from a current position of an aircraft to a destination airport utilizing an integrated avionics system, such as the integrated avionics system 100 described above. As shown in FIG. 17, a FAF is created for the destination (Block 1602). For example, the processor 202 can determine a lateral position for the FAF that reflects the position of an existing published FAF. A route is created from the current position of the aircraft to the FAF (Block 1604). In some embodiments, the processor 202 can create a direct route at the present altitude between the current position and the FAF. In other embodiments, the processor 202 can create a route from the current position of the aircraft to the FAF that accounts for the terrain and/or obstacle characteristics. The processor 202 can create a route that avoids terrain and/or obstacle characteristics that exceed a predetermined condition. In some embodiments, the processor 202 can compare the terrain characteristics and/or obstacle characteristics with a predefined elevation and/or altitude threshold. For example, the processor 202 can identify elevation and/or altitude of a land region, and create a waypoint at a preselected altitude (e.g., 1000 ft.), above the highest terrain. In some embodiments, the route can comprise a FAF-1, where FAF-1 is a distance back from the FAF in the direction of the MAP to FAF course such that the path is under the glide path.

In some embodiments, the processor 202 can then create a hold at the FAF. For example, the processor 202 can create a standard (e.g., right turn) or non-standard (e.g., left turn) holding pattern at the FAF, at the FAF altitude, with minimum leg length, where the inbound course of the hold equals the outbound course from the FAF. In embodiments, the hold pattern can be based on one or more of the speed of the aircraft, the altitude of the aircraft, and/or the course of the aircraft. For example, a hold pattern can be traversed if one or more of the following conditions are met: 1) a speed of the aircraft is within a defined tolerance relative to the approach speed, 2) the course of the aircraft is within a defined tolerance relative to the FAF (e.g., within a defined tolerance of the FAF to the FAF+1), and the altitude of the aircraft is within a defined tolerance relative to the altitude of the FAF.

The processor 202 can also create a waypoint associated with the runway (e.g., at the start of the runway) to allow for navigation of the runway (e.g., alignment). In one or more implementations, the aircraft route calculation process 1600 can be performed to determine and/or analyze a route in view of predefined characteristics (e.g., distance, terrain characteristics, weather characteristics, etc.).

The route to the FAF is loaded to the flight plan (Block 1606). The published MAP to the runway endpoint is then loaded to the flight plan (Block 1608). In one or more embodiments, the MAP is adjusted based on clearance and/or runway alignment of the aircraft (Block 1610). For example, a final approach segment can be calculated based on the published FAF and MAP. The final approach segment can be determined using one or more final approach segment determination processes (e.g., as described with reference to FIG. 18) and/or the techniques (e.g., as described with reference to FIGS. 3A through 3F). In some implementations, the final approach segment is adjusted based on one or more obstacle and/or terrain characteristics. For example, a clearance detection plane can be determined by offsetting the FAF altitude by a configurable FAF clearance amount and determining a second glide path angle ($\theta_2$) associated with the $GPIP_1$ The module 214 can then cause the processor 202 to evaluate terrain and/or obstacle data for intrusion against the detection plane (e.g., identify one or more terrain characteristics and/or obstacle characteristics with an elevation and/or altitude that exceed that of the detection plane). The module 214 then determines an adjusted final approach segment that accounts for the terrain and/or obstacle characteristics. In embodiments, the module 214 causes the processor 202 to determine a vertical path adjustment for the approach fix. For example, the module 214 causes the processor 202 to determine a GPIP lateral offset associated with the terrain characteristic and/or obstacle characteristic, and an associated offset glide path intercept point ($GPIP_2$). The processor 202 then adjusts the final approach segment by adjusting the FAF altitude and/or the MAP altitude based on the $GPIP_2$ and the original glide path angle ($\theta_1$).

In some implementations, weather data is received (Block 1612). The weather data can include at least one weather intensity characteristic and the terrain data can include at least one terrain characteristic. For example, the processor 202 can operate on the aircraft route calculation process to analyze weather data (e.g., weather radar, XM, datalink weather, icing data) and/or forecast data (e.g., Winds and Temperatures Aloft Forecast data, turbulence data, windshear data, NEXRAD data, etc.) for weather intensity characteristics. Weather intensity characteristics can include, but are not necessarily limited to: precipitation level, precipitation type (e.g., rain, snow, sleet, etc.), atmospheric conditions (e.g., wind speed, wind direction, temperature, etc.), storm attributes (e.g., storm top elevation, reflectivity, vertically integrated water, probability of hail, probability of severe hail, maximum hail stone diameter size, speed and/or direction of storm movement, tornadic activity, etc.), and so forth.

In some implementations, the weather intensity characteristic is compared to a predefined condition along the route (Block 1614). For example, the autoland module 214 can cause the processor 202 to compare whether intensity characteristics to a predefined severity and/or intensity threshold. In some implementations, the system determines if the route can be re-created to avoid weather characteristics that exceed the predefined condition (Decision Block 1616). If the route cannot be re-created (NO to Decision Block 1616), then the parameters defining the predefined condition are modified until the route can be re-created (Block 1618). For example, the processor 202 can modify the tolerance for the predefined condition (e.g., expand the tolerance for weather severity) until a route can be determined. If the route can be re-created (YES to Decision Block 1616), then the route is re-created to avoid weather intensity characteristics that exceed the predefined condition (Block 1620). The autoland module 214 can cause the processor 202 to create one or more waypoints associated with the weather intensity characteristics. For example, the processor 202 can create one or more waypoints to avoid severe weather areas and/or predicted severe weather areas, as described above. As the aircraft passes a waypoint, the processor 202 can operate on the aircraft route calculation process to dynamically analyze weather data and/or forecasting data of the re-created course and create waypoints until no weather intensity characteristics exceeding the predefined condition remain on the route to the FAF. Once the route is re-created, the system 100 can return to Block 1606 to load the re-created route in order to traverse the re-created route.

Figure 18:
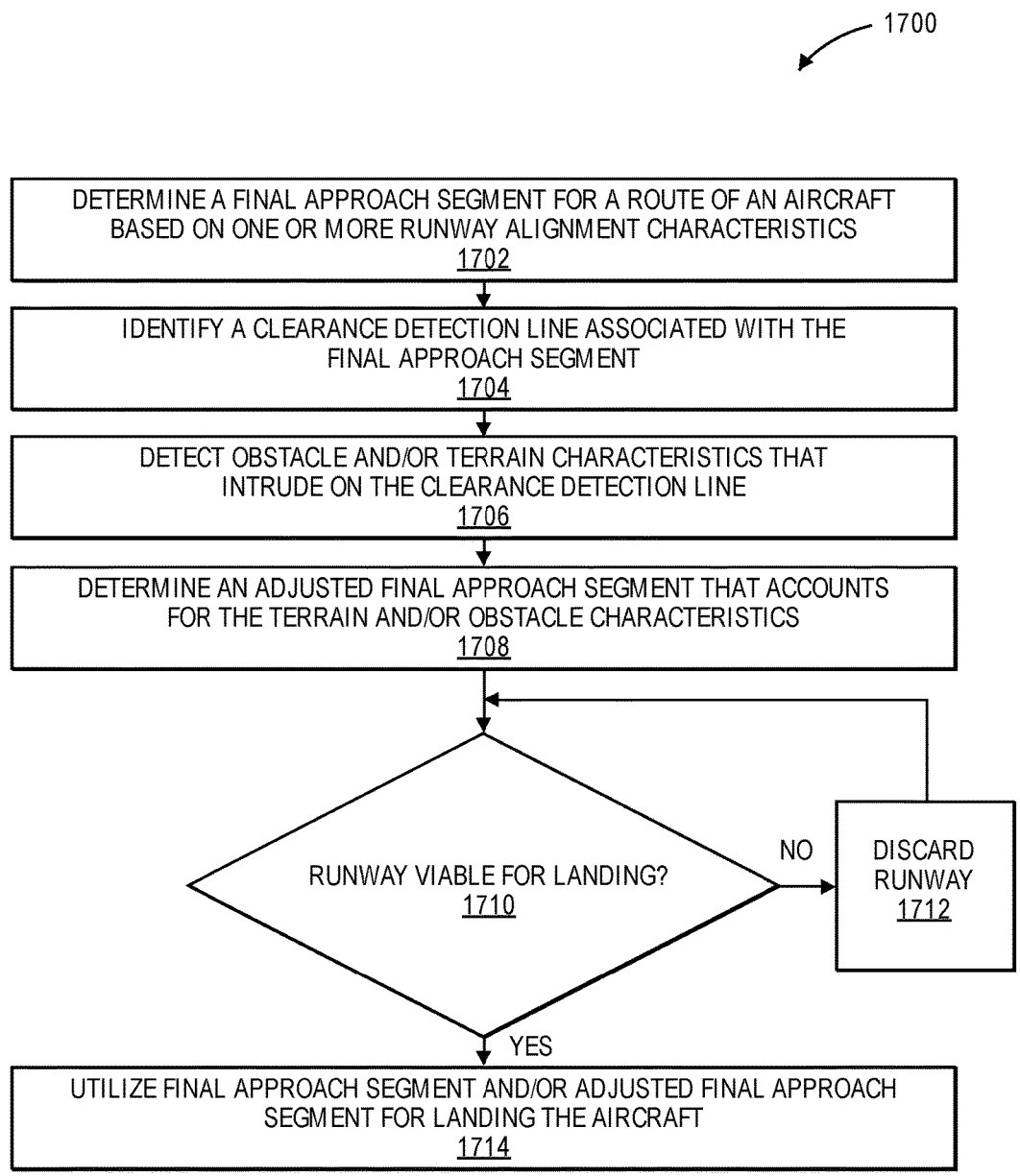
FIG. 18 is an example flow diagram illustrating an example process for determining a final approach segment for a route of an aircraft, in accordance with an example implementation of the present disclosure.

FIG. 18 illustrates an example process 1700 for determining a final approach segment for a route of an aircraft utilizing an integrated avionics system, such as the integrated avionics system 100 described above. As shown in FIG. 18, a final approach segment associated with a route of an aircraft is determined based on one or more runway alignment characteristics (Block 1702). Runway alignment characteristics can include, but are not necessarily limited to: approach fix (e.g., FAF), glide path intercept point (GPIP$_1$), glide path angle ($\theta_1$), threshold crossing height (TCH$_1$), MAP, and so forth. For example, the module 214 can cause the processor to determine a path from the FAF to the GPIP$_1$. The placement of the MAP can be over the runway threshold, or may be artificially adjusted to the runway threshold. The runway alignment characteristics can be furnished to the autoland module 214 by other components internal to the system 100 (e.g., FMS, AHRS, ADCs, IDUs, other modules, etc.) and/or by a user (e.g., pilot). In some embodiments, the autoland module 214 can obtain the runway alignment characteristics from the published flight plan.

A clearance detection plane associated with the final approach segment is identified (Block 1704). For example, a clearance detection plane can be determined by offsetting the FAF altitude by a configurable FAF clearance amount and determining a second glide path angle ($\theta_2$) associated with the GPIP$_1$ Obstacle characteristics and/or terrain characteristics that intrude on the clearance detection plane are detected (Block 1706). The module 214 can cause the processor 202 to evaluate terrain and/or obstacle data for intrusion against the detection plane. For example, the processor 202 can identify one or more terrain characteristic and/or obstacle characteristic with an elevation and/or altitude that exceeds that of the detection plane.

In one or more embodiments, an adjusted final approach segment is determined that accounts for the terrain and/or obstacle characteristics (Block 1708). The module 214 causes the processor 202 to determine a vertical path adjustment for the approach fix. For example, the processor 202 can determine a GPIP lateral offset associated with the terrain characteristic and/or obstacle characteristic, and an associated offset glide path intercept point (GPIP$_2$). The processor 202 then adjusts the final approach segment by adjusting the FAF altitude and/or the MAP altitude based on the GPIP$_2$ and the original glide path angle ($\theta_1$). As shown in FIG. 3F above, the adjusted final approach segment will have the same approach angle ($\theta_1$) as the published approach (e.g., the adjusted final approach segment will be parallel to the original published approach segment), but will utilize a shorter landing distance (e.g., landing distance$_2$) than the landing distance for the published approach (e.g., landing distance$_1$).

The system then determines if the runway is viable for landing based on the final approach segment and/or the adjusted final approach segment (Decision Block 1710). For example, the module 214 can cause the processor 202 to determine that the runway is nonviable when the shortened landing distance (landing distance$_2$) is beneath a predetermined distance threshold. If the runway is determined to be nonviable (NO to decision block 1710), the runway is discarded and not used for landing (Block 1712). In some embodiments, visual inspection of the path can be utilized to determine a final approach segment. In other embodiments, the module 214 can cause the processor 202 to select an alternative runway utilizing the techniques described herein. If the runway is viable (YES to Decision Block 1710), the final approach segment and/or adjusted final approach segment is utilized for landing the aircraft (Block 1714).

CONCLUSION

Although the integrated avionics system 100 has been described with reference to example implementations illustrated in the attached drawing figures, it is noted that equivalents may be employed and substitutions made herein without departing from the scope of the invention as recited in the claims. Further, the integrated avionics system 100, including respective components, as illustrated and described herein is merely an example of a system and components that may be used to implement the present disclosure and may be replaced with other devices and components without departing from the scope of the present disclosure.

What is claimed is:

1. An aircraft autoland system comprising:
  a memory operable to store one or more modules; and
  a processor coupled to the memory, the processor operable to execute the one or more modules to cause the processor to:
  identify a plurality of potential destinations for an aircraft;
  calculate a merit for each of the plurality of potential destinations;
  select a destination based upon the merit;
  receive weather data and at least one of terrain data or obstacle data, the weather data including at least one weather intensity characteristic, the terrain data including at least one terrain characteristic and the obstacle data including at least one obstacle characteristic;
  create a first route from a current position of the aircraft to an approach fix associated with the destination, the route accounting for at least one of the terrain characteristics or the obstacle characteristics;
  compare the at least one weather intensity characteristic to a predefined condition along the route;
  re-create the route when the at least one weather intensity characteristic exceeds the predefined condition;

cause the aircraft to select and traverse one of the first route and the re-created route, the re-created route traversed when the at least one weather intensity characteristic exceeds the predefined condition;
determine a final approach segment associated with the selected route;
identify at least one of the terrain characteristic or the obstacle characteristic associated with the final approach segment;
determine an adjusted final approach segment, the adjusted final approach segment accounting for the at least one of the terrain characteristic or the obstacle characteristic associated with the final approach segment; and
cause the aircraft to land at the destination utilizing at least one of the final approach segment or the adjusted final approach segment without requiring pilot intervention.

2. The aircraft autoland system as recited in claim 1, wherein the destination is a destination airport.

3. The aircraft autoland system as recited in claim 2, wherein calculate the merit for each destination further comprises: calculate one or more runway merits, and calculate a total merit based upon the one or more runway merits; and wherein the processor is further configured to select the destination airport based upon the total merit.

4. The aircraft autoland system as recited in claim 3, wherein the one or more runway merits comprise at least one of a final approach course alignment merit for a runway corresponding to each airport, a travel time merit corresponding to each airport, an airport attribute merit corresponding to each airport, a runway characteristics merit for a runway corresponding to each airport, or a weather conditions merit corresponding to each airport.

5. The aircraft autoland system as recited in claim 3, wherein the processor is operable to execute the one or more modules to cause the processor to:
determine the aircraft has landed on a runway at the airport; and
in response to determining that the aircraft has landed on the runway, cause an engine to transition from an operational state to a non-operational state.

6. The aircraft autoland system as recited in claim 1, wherein the at least one weather intensity characteristic represents a weather condition.

7. The aircraft autoland system as recited in claim 1, wherein the merit can comprise a positive or negative value corresponding to an optimal destination or a non-optimal destination, respectively, and wherein the non-optimal destination is selected when no optimal destinations are identified.

8. The aircraft autoland system as recited in claim 1, wherein the approach fix includes at least one of an initial approach fix, a final approach fix, a point from a published approach, or a visual approach fix.

9. An aircraft autoland system comprising:
a memory operable to store one or more modules; and
a processor coupled to the memory and operably coupled to at least one of an engine of an aircraft, a braking system of the aircraft, or an aerodynamic control of the aircraft, the processor operable to execute the one or more modules to cause the processor to:
identify a plurality of potential destinations for the aircraft;
calculate a merit for each of the plurality of potential destinations;
select a destination based upon the merit;
receive weather data associated with the route of the aircraft and at least one of terrain data or obstacle data, the weather data including at least one weather intensity characteristic, the terrain data including at least one terrain characteristic and the obstacle data including at least one obstacle characteristic;
create a first route from a current position of the aircraft to an approach fix associated with the destination, the route accounting for at least one of the terrain characteristics or the obstacle characteristics;
compare the at least one weather intensity characteristic to a predefined condition along the first route;
re-create the first route when the at least one weather intensity characteristic exceeds the predefined condition;
cause the aircraft to select and traverse one of the first route and the re-created route by actuating at least one of the engine or the aerodynamic control in accordance with the route, the re-created route traversed when the at least one weather intensity characteristic exceeds the predefined condition;
determine a final approach segment associated with the selected route;
identify at least one of the terrain characteristic or the obstacle characteristic associated with the final approach segment;
determine an adjusted final approach segment, the adjusted final approach segment accounting for the at least one of the terrain characteristic or the obstacle characteristic associated with the final approach segment; and
cause the aircraft to land at the destination utilizing at least one of the final approach segment or the adjusted final approach segment without requiring pilot intervention.

10. The aircraft autoland system as recited in claim 9, wherein the destination is a destination airport.

11. The aircraft autoland system as recited in claim 10, wherein calculate the merit for each destination further comprises: calculate one or more runway merits, and calculate a total merit based upon the one or more runway merits; and wherein the processor is further configured to select the destination airport based upon the total merit.

12. The aircraft autoland system as recited in claim 9, wherein the merit can comprise a positive or negative value corresponding to an optimal destination or a non-optimal destination, respectively, and wherein the non-optimal destination is selected when no optimal destinations are identified.

13. The aircraft autoland system as recited in claim 9, wherein the approach fix includes at least one of an initial approach fix, a final approach fix, a point from a published approach, or a visual approach fix.

14. The aircraft autoland system as recited in claim 9, wherein the processor is operable to execute the one or more modules to cause the processor to:
determine the aircraft has landed; and
in response to determining that the aircraft has landed, cause the engine to transition from an operational state to a non-operational state.

15. A process for autolanding an aircraft:
identifying a plurality of potential destinations for an aircraft;
calculating a merit for each of the plurality of potential destinations;
selecting a destination based upon the merit;

receiving weather data and at least one of terrain data or obstacle data, the weather data including at least one weather intensity characteristic, the terrain data including at least one terrain characteristic and the obstacle data including at least one obstacle characteristic;

creating a first route from a current position of the aircraft to an approach fix associated with the destination, the route accounting for at least one of the terrain characteristics or the obstacle characteristics;

comparing at least one weather intensity characteristic to a predefined condition along the first route;

re-creating the first route when the at least one weather intensity characteristic exceeds the predefined condition;

causing the aircraft to select and traverse one of the first route and the re-created route;

determining a final approach segment associated with the selected route;

identifying at least one of the terrain characteristic or the obstacle characteristic associated with the final approach segment;

determining an adjusted final approach segment, the adjusted final approach segment accounting for the at least one of the terrain characteristic or the obstacle characteristic associated with the final approach segment; and causing the aircraft to land at the destination utilizing at least one of the final approach segment or the adjusted final approach segment without requiring pilot intervention.

16. The process as recited in claim 15, wherein the destination is a destination airport.

17. The process as recited in claim 16, wherein the at least one weather intensity characteristic represents a weather condition.

18. The process as recited in claim 16, wherein calculating the merit for each destination further comprises: calculating one or more runway merits, and calculating a total merit based upon the one or more runway merits; and wherein the processor is further configured to select the destination airport based upon the total merit.

19. The process as recited in claim 15, wherein the merit can comprise a positive or negative value corresponding to an optimal destination or a non-optimal destination, respectively, and wherein the non-optimal destination is selected when no optimal destinations are identified.

20. The process as recited in claim 15, wherein the approach fix includes at least one of an initial approach fix, a final approach fix, a point from a published approach, or a visual approach fix.

* * * * *